United States Patent
Siddiqui et al.

(10) Patent No.: US 9,010,696 B2
(45) Date of Patent: *Apr. 21, 2015

(54) WALL STUD MOUNTING BRACKET FOR SECURING AND POSITIONING FLEXIBLE CONDUIT AND CABLE

(75) Inventors: Asim Siddiqui, Elgin, IL (US); Anthony Caringella, Norridge, IL (US); Tom Colangelo, Lombard, IL (US); Justin McMath, Chicago, IL (US)

(73) Assignee: Illinois Tool Works, Inc., Glenview, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/398,251

(22) Filed: Feb. 16, 2012

(65) Prior Publication Data
US 2012/0297723 A1 Nov. 29, 2012

Related U.S. Application Data

(63) Continuation-in-part of application No. 13/117,837, filed on May 27, 2011.

(51) Int. Cl.
*F16L 3/08* (2006.01)
*H01H 9/02* (2006.01)
*F16L 3/24* (2006.01)
*H02G 3/32* (2006.01)

(52) U.S. Cl.
CPC .. *F16L 3/24* (2013.01); *H02G 3/32* (2013.01); *Y10S 248/906* (2013.01)

(58) Field of Classification Search
USPC ............... 248/351, 906, 205.1, 300, 222.12, 248/229.16, 221.11, 229.26, 222.11, 72, 248/228.1, 65, 73, 67.5, 67.7, 316.5, 230.4; 174/58, 3.9, 481, 72 A, 72 R
See application file for complete search history.

(56) References Cited

U.S. PATENT DOCUMENTS

| | | | |
|---|---|---|---|
| 2,466,912 A * | 4/1949 | Rice | ............................. 248/74.3 |
| 2,809,002 A | 10/1957 | Rudolph | |
| 3,104,087 A | 9/1963 | Budnick et al. | |
| 3,214,126 A | 10/1965 | Roos | |
| 3,588,019 A | 6/1971 | Cozeck et al. | |

(Continued)

OTHER PUBLICATIONS

European Patent Office, International Searching Authority, International Search Report and Written Opinion of PCT/US2012/039635, Date of Mailing Aug. 6, 2013, 11 pages.

(Continued)

*Primary Examiner* — Christopher Garft
(74) *Attorney, Agent, or Firm* — Klintworth & Rozenblat IP LLC

(57) ABSTRACT

A support assembly connected with a stud for securing and guiding conduit and/or cable is provided. The support assembly includes, but is not limited to, a securing arm for securing and guiding the conduit and/or cable and an engaging tab coupled with an end of the securing arm. The engaging tab includes a first engagement member facing a second engagement member, a side engagement member connecting the first and second engagement members together, and a first compressible member extending in a first direction $D_1$ either from the first engagement member towards the second engagement member or from the second engagement member towards the first engagement member. The first compressible member is compressible in a second direction $D_2$ opposite that of the first direction $D_1$.

12 Claims, 36 Drawing Sheets

(56) References Cited

U.S. PATENT DOCUMENTS

| | | | |
|---|---|---|---|
| 3,720,395 A | 3/1973 | Schuplin | |
| 3,730,466 A | 5/1973 | Swanquist | |
| 3,804,359 A | 4/1974 | Cumber | |
| 4,362,284 A | 12/1982 | Bolante | |
| 4,460,139 A * | 7/1984 | Bochen et al. | 248/68.1 |
| 4,623,102 A * | 11/1986 | Hough, Jr. | 248/68.1 |
| 4,971,280 A | 11/1990 | Rinderer | |
| 5,004,199 A | 4/1991 | Suk | |
| 5,036,949 A | 8/1991 | Crocker et al. | |
| 5,044,582 A | 9/1991 | Walters | |
| 5,141,185 A * | 8/1992 | Rumbold et al. | 248/71 |
| 5,386,959 A | 2/1995 | Laughlin et al. | |
| 5,579,939 A | 12/1996 | Bourassa | |
| 5,624,202 A | 4/1997 | Grierson | |
| 5,626,316 A | 5/1997 | Smigel et al. | |
| 5,810,303 A | 9/1998 | Bourassa et al. | |
| 6,032,306 A * | 3/2000 | Gummin | 4/610 |
| 6,389,658 B1 * | 5/2002 | Pfaller et al. | 24/545 |
| 6,595,479 B2 | 7/2003 | Johnson et al. | |
| 6,996,943 B2 | 2/2006 | Denier et al. | |
| 7,219,863 B1 | 5/2007 | Collett, II | |
| 7,857,275 B2 | 12/2010 | De la Borbolla | |
| 7,956,285 B2 | 6/2011 | Tally et al. | |
| 8,177,176 B2 | 5/2012 | Nguyen et al. | |
| 8,403,277 B2 | 3/2013 | Nuernberger et al. | |
| 8,857,771 B2 | 10/2014 | Streetman | |
| 2005/0092510 A1 | 5/2005 | Dinh | |
| 2006/0237601 A1 | 10/2006 | Rinderer | |
| 2007/0057130 A1 | 3/2007 | Nikayin et al. | |
| 2008/0142646 A1 * | 6/2008 | Magno et al. | 248/65 |
| 2010/0050561 A1 | 3/2010 | Jafari | |
| 2012/0298816 A1 | 11/2012 | Siddiqui et al. | |

OTHER PUBLICATIONS

European Patent Office, International Searching Authority, International Search Report and Written Opinion of PCT/US2013/025682, Date of Mailing May 14, 2013, 12 pages.

* cited by examiner

WALL STUD MOUNTING BRACKET FOR SECURING AND POSITIONING FLEXIBLE CONDUIT AND CABLE

CROSS-REFERENCES TO RELATED APPLICATIONS

The Present application is a continuation-in-part of U.S. patent application Ser. No. 13/117,837 entitled "ELECTRICAL BOX SUPPORT ASSEMBLY" and filed on May 27, 2011 with the United States Patent and Trademark Office, the contents of which are hereby incorporated by reference in their entirety to the extent permitted by law.

BACKGROUND OF THE INVENTION

Certain applications require fastening a support assembly to a wall stud. The support assembly may be used for various purposes, such as to hold an electrical box or to secure and guide cables within a studded wall. Preferably the support assembly includes a wall stud bracket for fastening the support assembly to a wall stud. For example, some applications require using a support assembly which includes a two part telescoping strut for supporting an electrical box or similar device in a studded wall. Preferably, the support assembly includes a pair of wall stud brackets connected with the telescoping strut, one on each end of the strut, which are then each fastened to a wall stud. The strut includes two horizontally adjustable telescoping parts which are used to adjust the length of the strut to match the distance in between a pair of studs for proper mounting of the strut to the pair of studs. The strut includes a fastening mechanism, such as an outwardly opening V-shape horizontal groove, to facilitate positioning, alignment and fastening of the electrical boxes to the strut. The driving of a fastener from the box to the fastening mechanism, not only aligns and fastens the electrical box with the strut, but also secures the two horizontally adjustable telescoping parts of the strut together.

Unfortunately electrical boxes come in two separate depths which require different spacing or set back of the strut from the edges of the studs for each box depth size. Therefore, a customer or installer would require different types of struts for different box depths even though the only difference in the struts would be a difference in the pre-bent ends or flanges by means of which the strut parts are secured to the studs. Pre-bent flanges for one type of stud mounting make it difficult if not impossible to mount the strut in any other fashion. This problem has created shipping and inventory problems for customers which required field selection of the right strut for the right box, and for the right stud mounting application.

Additionally, when fastening the strut to a stud, an installer would typically need to hold the strut with one hand and a fastener, such as a screw or nail, and fastening device, such as a screw driver or hammer, with another hand. The installer would then have to insert the fastener into the wall stud bracket connected with the strut, while holding the strut in the correction location on the wall stud, otherwise the strut would fall to the floor. Often times the installer would lose his or her grip on the strut and the strut would move or fall, resulting in possible misalignment of the fastened strut with the stud and a possible increase in the time required installing the electrical box and fasten the strut to the stud.

Other applications also require fastening a support assembly to a wall stud, such as where the support assembly includes a structural member used to position or guide flexible conduit or cable within a wall. In this application, the support assembly may include a wall stud bracket which is connected with the structural member used guide and position the flexible conduit or cable at a predetermined distance from the face of a drywall member which is later fastened to a wall stud. Typically, these support assemblies are stamped sheets or strips of metal that are secured to a wall stud using a screw fastener. Unfortunately, these support assembly are also difficult to fasten to a wall stud since an installer would typically need to hold the support assembly with one hand and a fastener, such as a screw or nail, and fastening device, such as a screw driver or hammer, with another hand. The installer would then have to insert the fastener into the support assembly, or a wall stud bracket connected with the support assembly, while holding the support assembly in the correction location on the stud, otherwise the support assembly would fall to the floor. Additionally, some support assemblies have a difficult time engaging and holding certain types of conduit or cable, such as armored cable which is protected by a corrugated metal sheathing.

As a result, it would be desirable to have a support assembly which can be more easily fastened to a stud and which does not require that the wall stud bracket be held in positioned by an installer in order to fasten the support assembly to a wall stud. Additionally, it would also be desirable to have a support assembly with a strut having the box securing advantages of the noted prior art strut, which could quickly be field formed to accommodate various box depths, while at the same time could be readily mounted to any interior or exterior surface of a metal stud, or the exterior of a wood stud. Moreover, it would also be desirable to have a support assembly which can engage and hold a certain types of conduit or cable, such as armored cable which is protected by a corrugated metal sheathing.

SUMMARY

The present invention is defined by the following claims, and nothing in this section should be taken as a limitation on those claims.

In one aspect, a support assembly connected with a stud for securing and guiding conduit and/or cable is provided. The support assembly includes, but is not limited to, a securing arm for securing and guiding the conduit and/or cable and an engaging tab coupled with an end of the securing arm. The engaging tab includes a first engagement member facing a second engagement member, a side engagement member connecting the first and second engagement members together, and a first compressible member extending in a first direction $D_1$ either from the first engagement member towards the second engagement member or from the second engagement member towards the first engagement member. The first compressible member is compressible in a second direction $D_2$ opposite that of the first direction $D_1$.

In one aspect, an engaging tab for connecting a structural member with a stud is provided. The engaging tab includes, but is not limited to, a first engagement member for primarily engaging a first non-mounting face of the stud, a second engagement member facing the first engagement member, a side engagement member connecting the first and second engagement members together, and a first compressible member connected with one of the first engagement member, the second engagement member, and the side engagement member. The second engagement member primarily engages a second non-mounting face of the stud. The side engagement member primarily engages a mounting face of the stud. At least a portion of the first compressible member extends from either the first engagement member or the second engagement member in a first direction $D_1$ either from the first engagement member towards the second engagement member or from the second engagement member towards the first engagement member. The first compressible member is compressible in a second direction $D_2$ opposite that of the first direction $D_1$.

In one aspect, a method for fastening a support assembly with a stud is provided. The method includes, but is not limited to, providing a support assembly having a structural member and an engaging tab for connecting the structural member with the stud and fastening the support assembly to the stud by pressing an engaging tab onto the stud and compressing a compressible member against the stud. The engaging tab is coupled with an end of the structural member. The engaging tab includes a first engagement member facing a second engagement member, a side engagement member connecting the first and second engagement members together, and a first compressible member extending either from the first engagement member towards the second engagement member or from the second engagement member towards the first engagement member.

BRIEF DESCRIPTION OF THE DRAWINGS

The invention can be better understood with reference to the following drawings and description. The components in the figures are not necessarily to scale, emphasis instead being placed upon illustrating the principles of the invention.

DETAILED DESCRIPTION

Methods and devices consistent with the present invention overcome the disadvantages of conventional electrical box support assemblies by using a u-shaped engaging tab having a pair of opposing engagement members and by having a compressible member extending from one of the opposing engagement members and towards another of the opposing engagement members, it is possible to readily mount and easily secure the electrical box support assembly of the present invention to any interior or exterior surface of a metal stud, or the exterior of a wood stud, preferably without the use of additional fasteners.

Additional methods and device consistent with the present invention overcome disadvantages of conventional support assemblies which use a wall stud bracket fastened to a wall stud to support a structural member by using an engaging tab for connecting the structural member with the wall stud. The engaging tab includes a pair of engagement members which engage non-mounting faces of the wall stud, a side engagement member which engages a mounting face of the wall stud, and a compressible member connected with one of the engagement members. By using an engaging tab along with a compressible member, a support assembly may be fastened to a wall stud more easily, since once engaged with the stud, the compressible member can hold the support assembly in a set position while an installer may insert additional fasteners through portions of the support assembly in order to securely fasten the support assembly to a wall stud.

Additional methods and device consistent with the present invention overcome disadvantages of conventional support assemblies which are used to position or guide flexible conduit or cable within a wall and use a wall stud bracket fastened to a wall stud to support a structural member by using an engaging tab for connecting the structural member with the wall stud. By using an engaging tab along with a compressible member, a support assembly may be fastened to a wall stud more easily, since once engaged with the stud, the compressible member can hold the support assembly in a set position while an installer may insert additional fasteners through portions of the support assembly in order to securely fasten the support assembly to a wall stud. Additionally, in one embodiment, the structural member is a securing arm which includes securing ribs, positioning ribs, and/or securing and positioning ribs to better help secure and/or guide flexible conduit or cable within a wall than a conventional support assembly.

Figure 1:
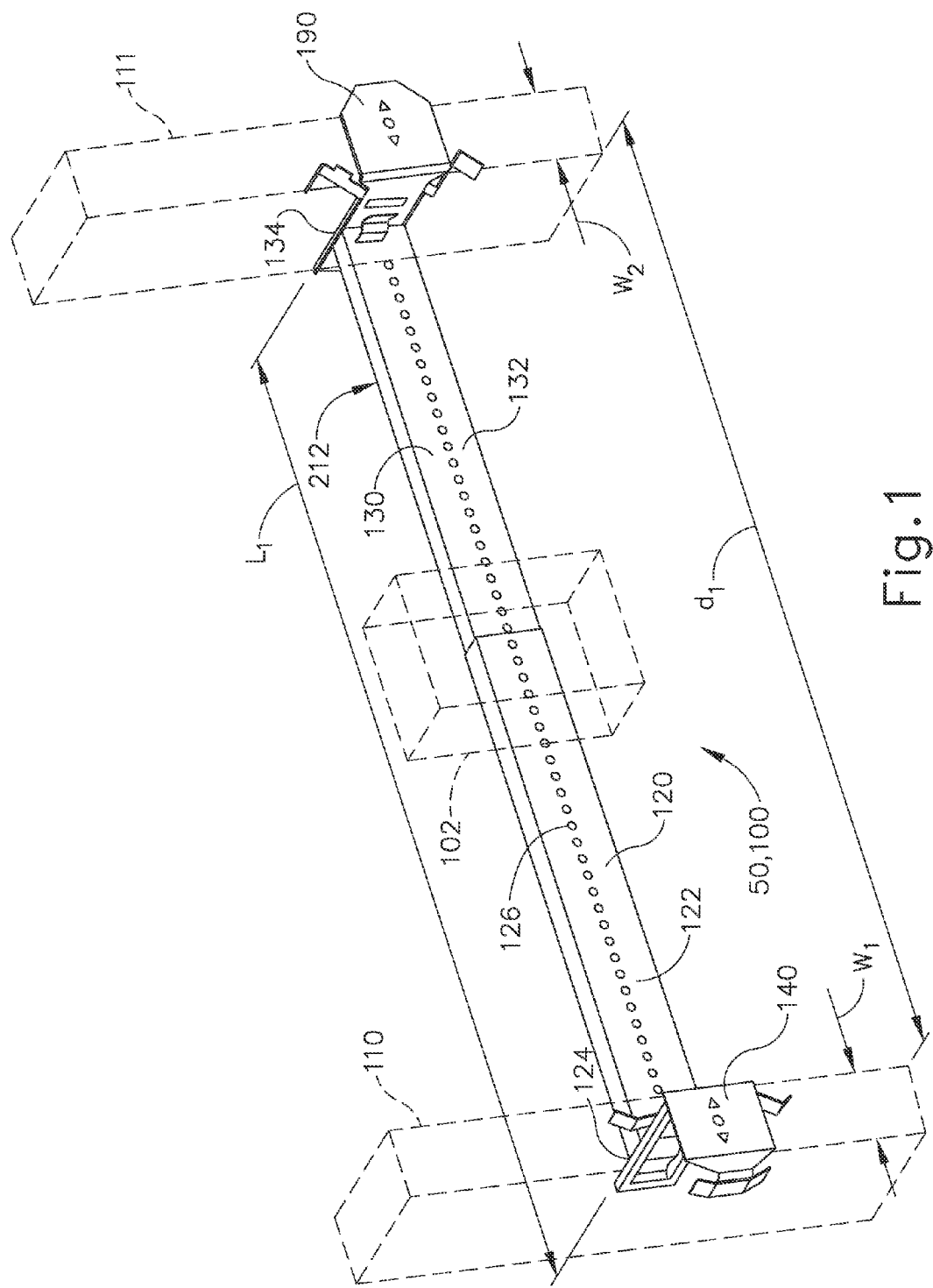
FIG. 1 depicts a perspective view of an electrical box support assembly for mounting an electrical box between a pair of studs, in accordance with one embodiment.
Figure 8:
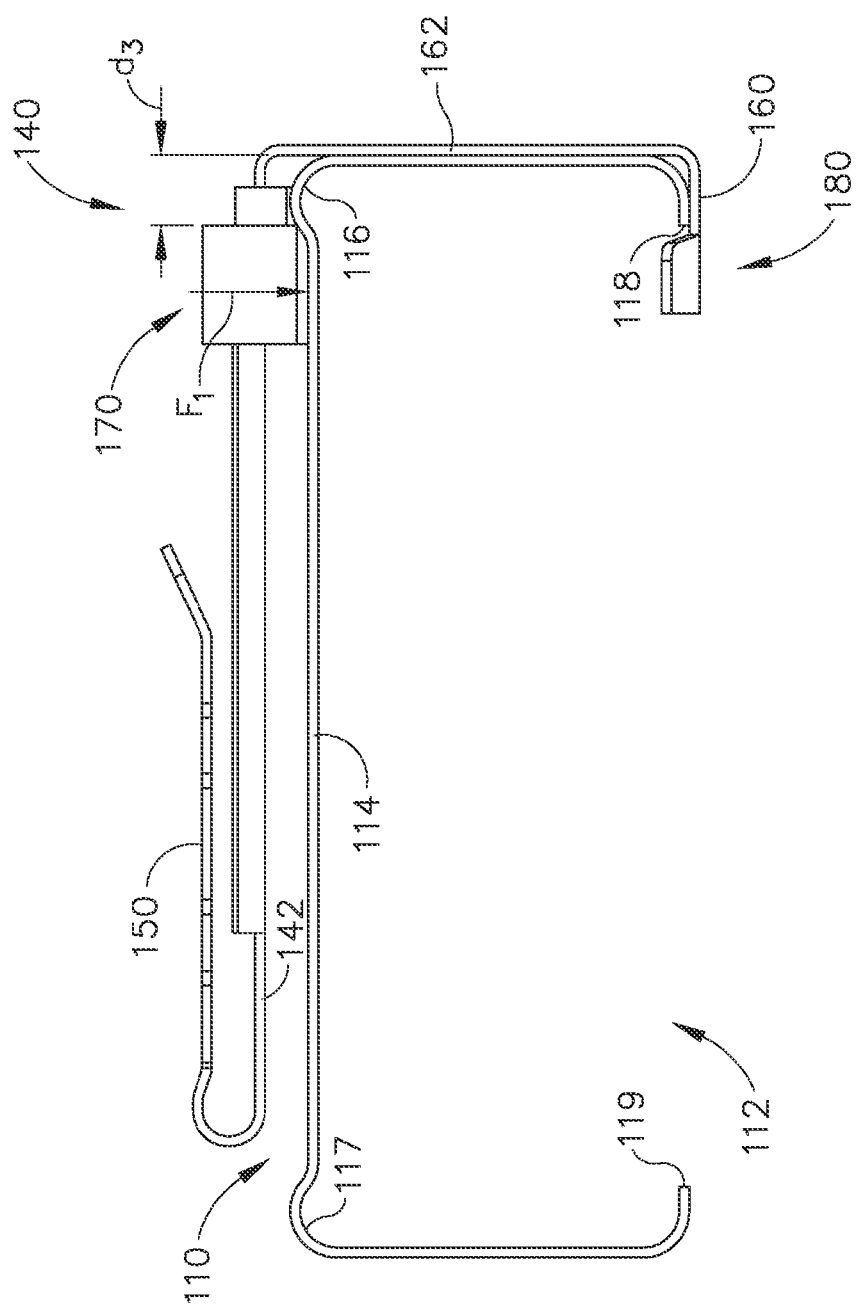
FIG. 8 depicts a side view of the first engaging tab shown in FIG. 2 connected with a stud in a second manner, in accordance with one embodiment.
Figure 9:
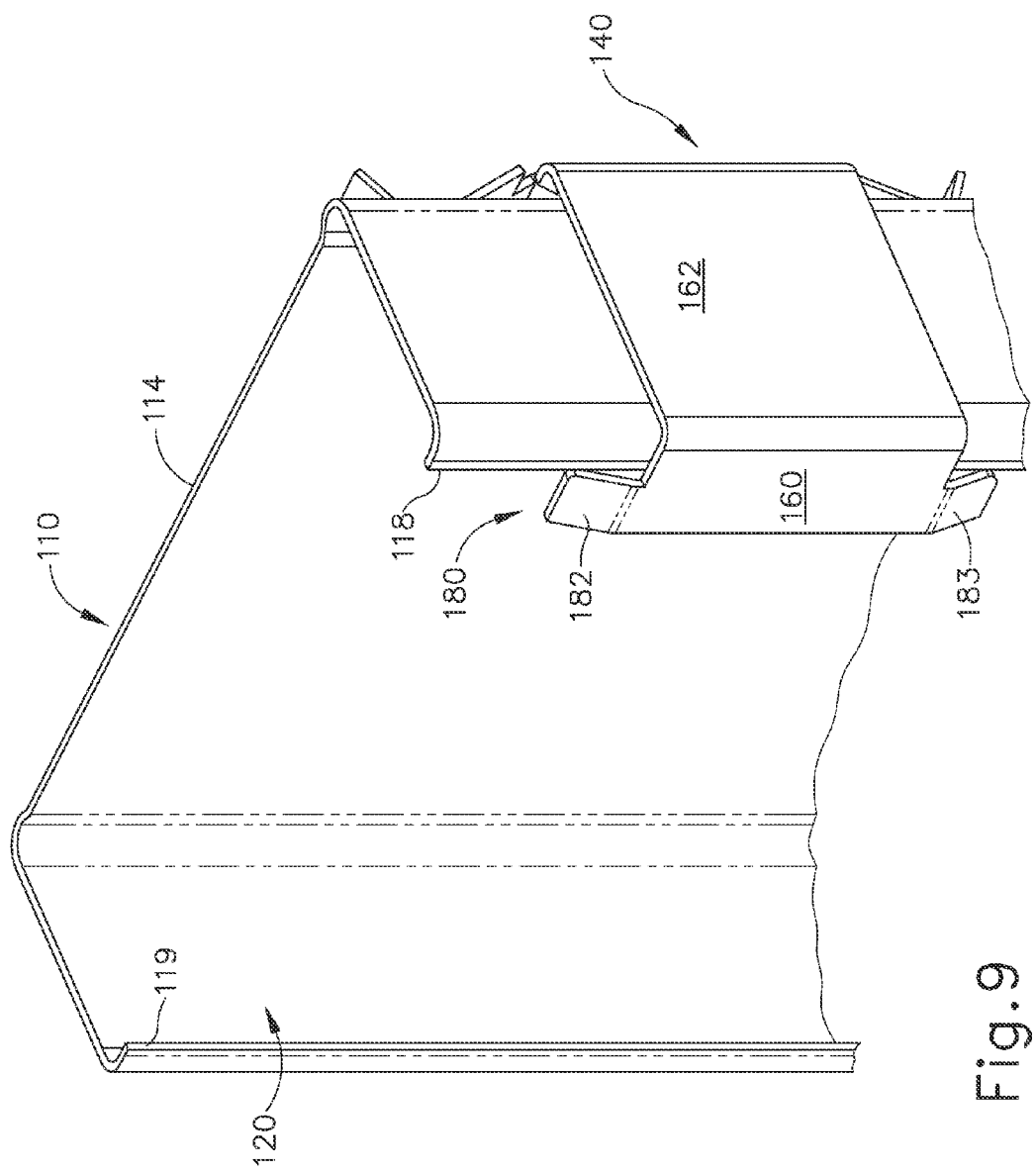
FIG. 9 depicts a first perspective view of the first engaging tab shown in FIG. 2 connected with a stud in a second manner, in accordance with one embodiment.
Figure 10:
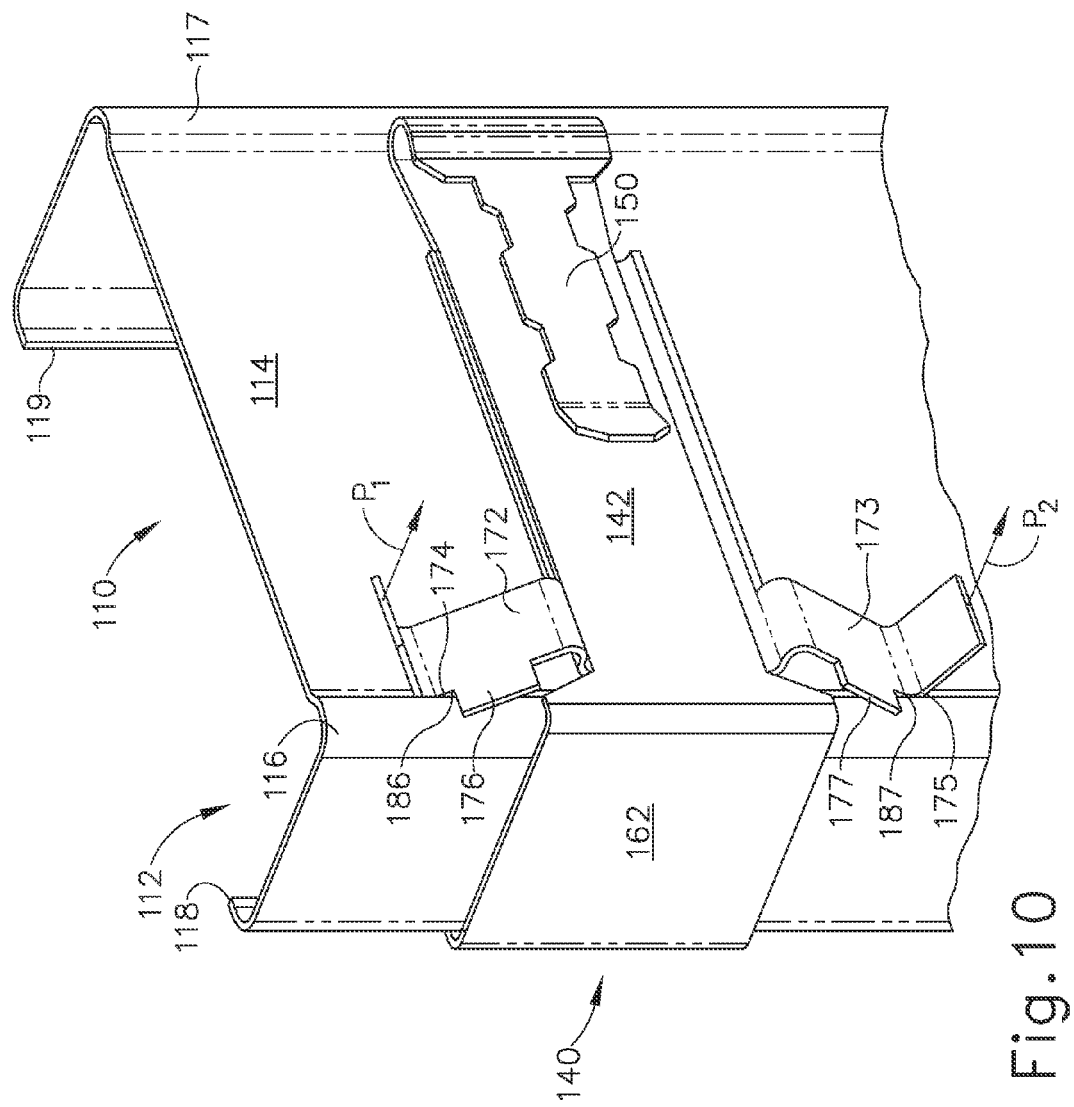
FIG. 10 depicts a second perspective view of the first engaging tab shown in FIG. 2 connected with a stud in a second manner, in accordance with one embodiment.
Figure 11:
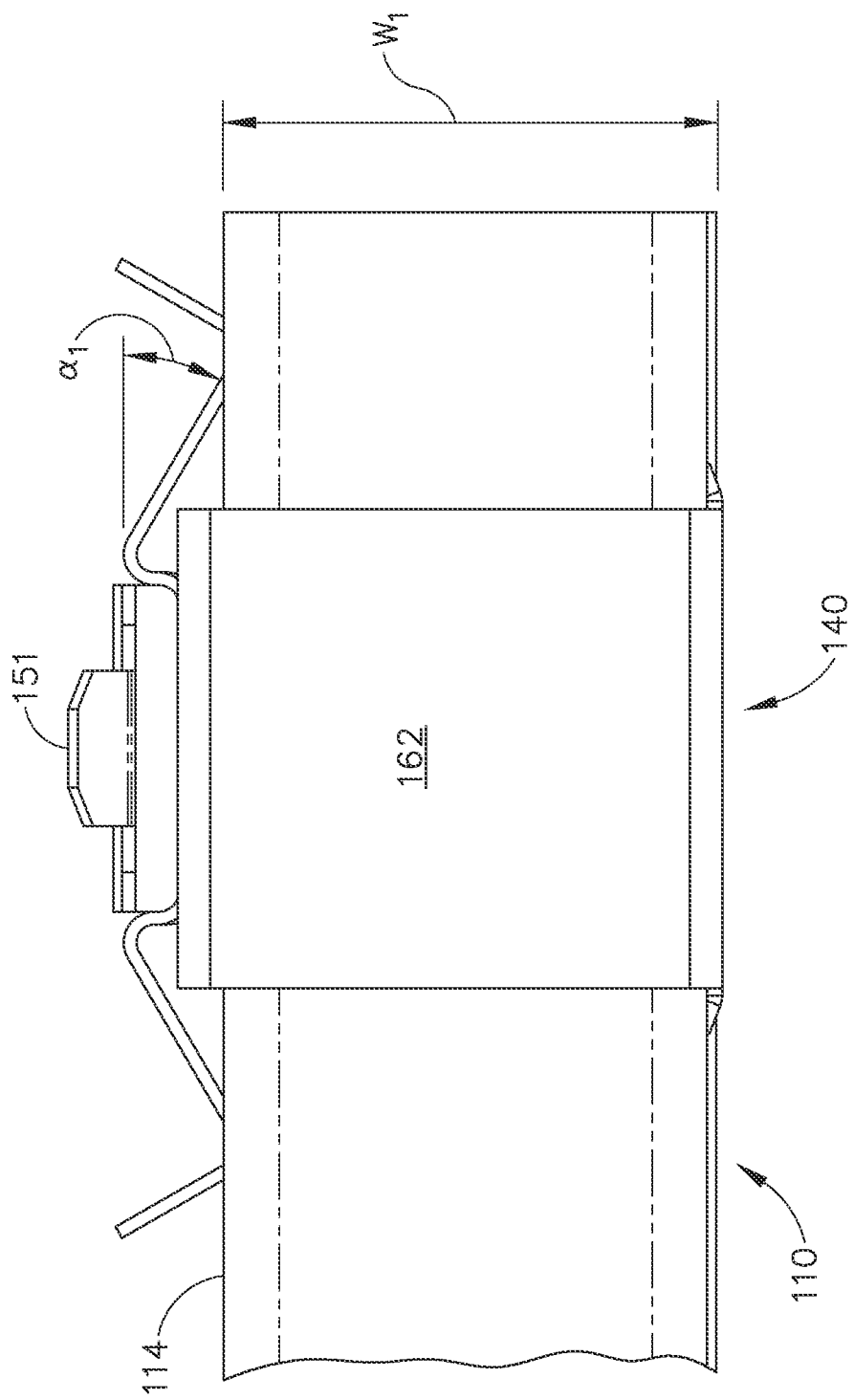
FIG. 11 depicts an alternate side view of the first engaging tab shown in FIG. 2 connected with a stud having a first width $W_1$, in accordance with one embodiment.
Figure 12:
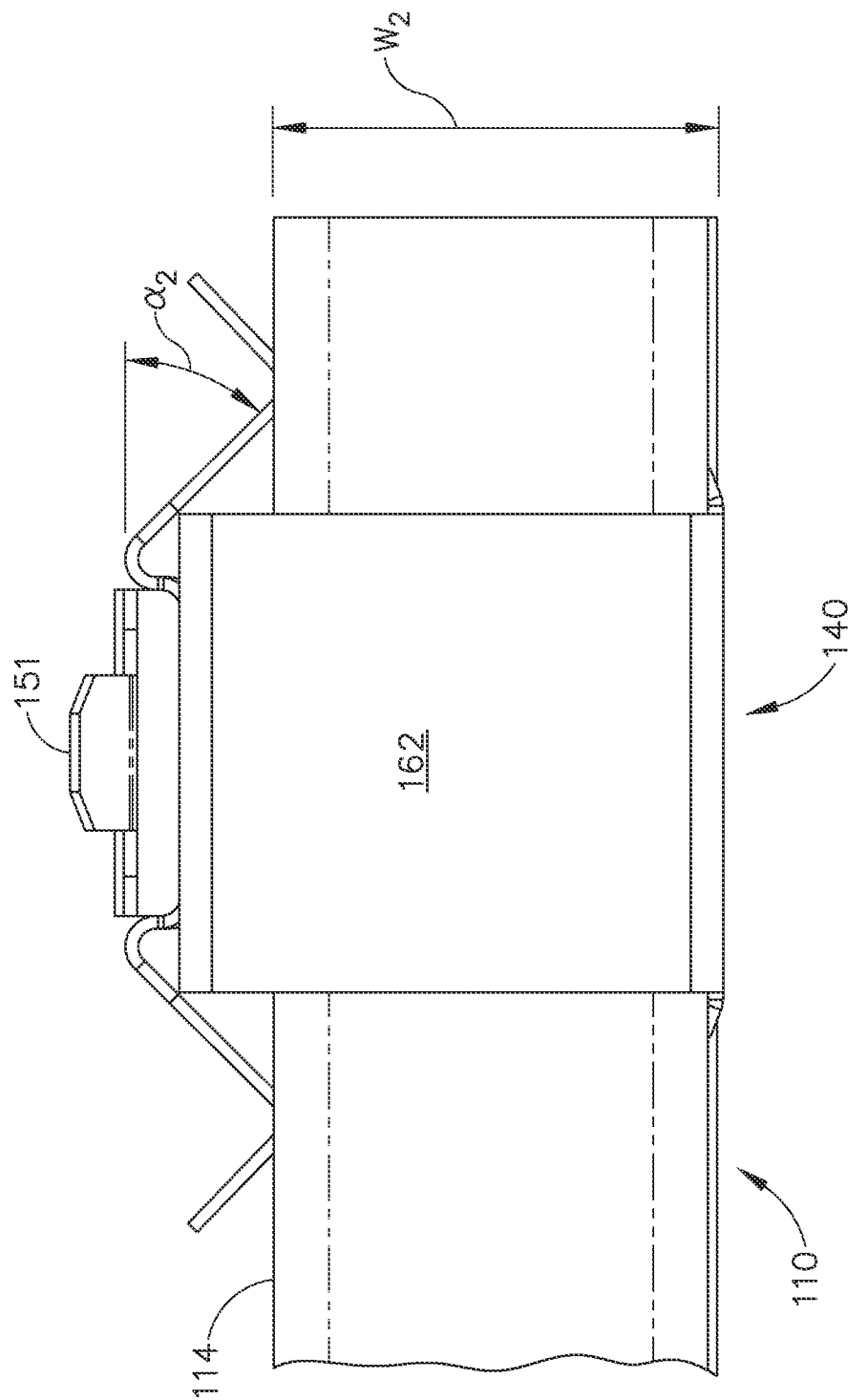
FIG. 12 depicts an alternate side view of the first engaging tab shown in FIG. 2 connected with a stud having a second width $W_2$, in accordance with one embodiment.
Figure 13:
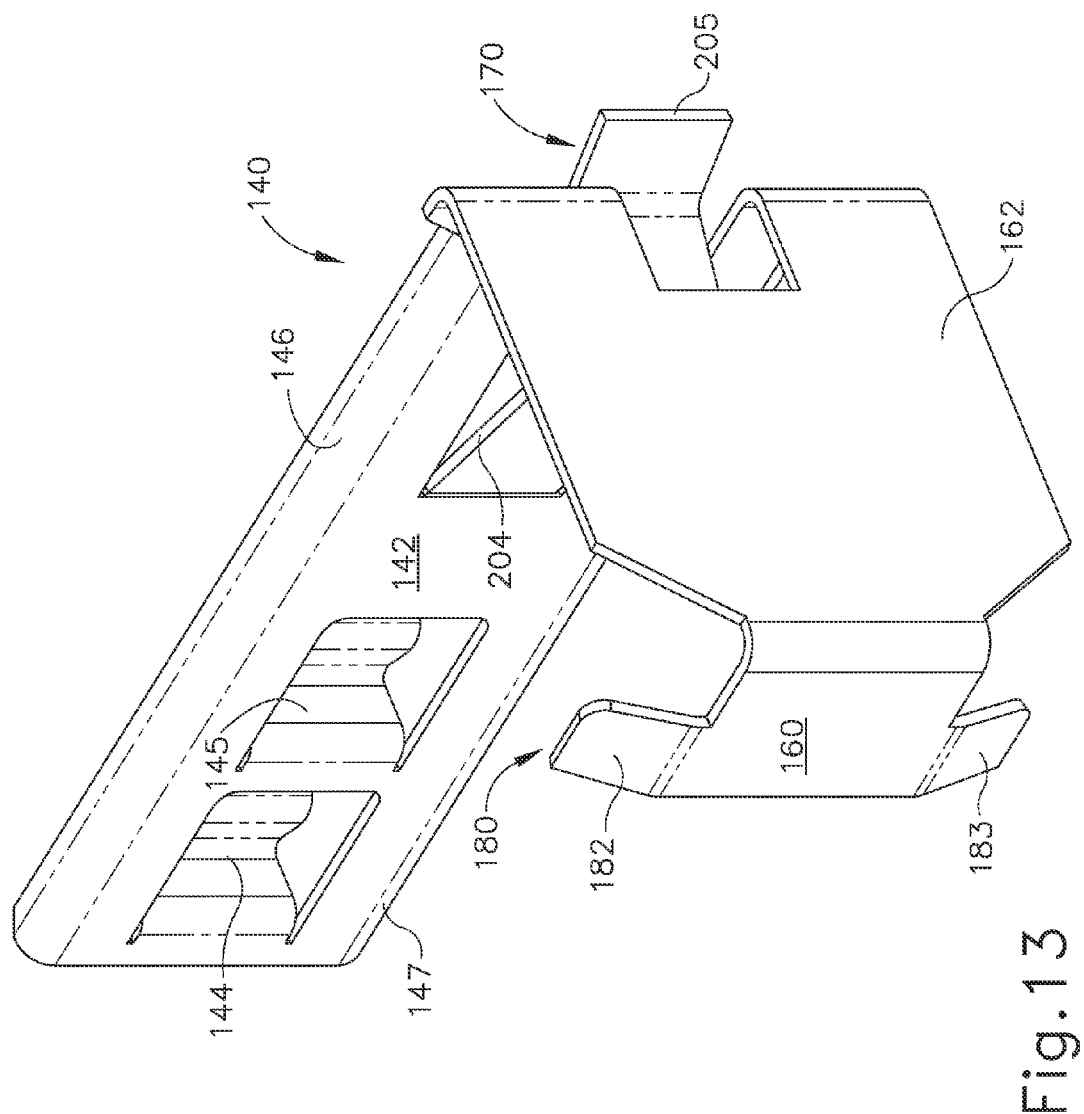
FIG. 13 depicts a first perspective view of a second engaging tab for an electrical box support assembly for mounting an electrical box between a pair of studs, in accordance with one embodiment.

With reference to FIG. 1, there is shown one embodiment of a support assembly 50 which is fastened to a wall stud 110. The support assembly 50 may be used for various purposes, such as to hold an electrical box 102 or to secure and guide conduit and/or cable 270 ("conduit/cable 270") within a studded wall. The support assembly 50 includes at least one engaging tab 140 for fastening the support assembly 50 to a wall stud along with a structural member 213. The engaging tab 140 is coupled with the wall stud 110, preferably by using a compressible member 170 which applies a force $F_1$, as shown in FIG. 8, in a direction which is opposed to that of the direction in which the compressible member 170 is compressed. The structural member 213 includes any structure which is connected with the engaging tab 140 and is required to be coupled with wall stud 110, such as a two part telescoping strut 120, 130 for supporting an electrical box 102 or similar device in a studded wall, a securing arm 220 for securing and/or guiding flexible conduit/cable 270 within a wall, a uni-body face plate or sheet providing mounting locations for one or many electrical junction boxes (these could hang from the side of the stud or span across multiple studs), or struts used to support plurality of rigid conduit or electrical metallic tubing.

With reference to FIG. 1, in one embodiment, the support assembly 50 is an electrical box support assembly 100 for mounting an electrical box 102 between a pair of stud supports (studs) 110. Electrical box 102 can be any type of box-like structure used for housing cables (i.e. electrical cables, data cables, or communications cables). Preferably, electrical box 102 includes five sides which form a cavity and an open side for access to the cavity. In one embodiment, the electrical box 102 is mated with an electrical box cover to cover the cavity and shield and/or protect the cables housed within. Electrical box 102 is typically mounted inside a wall behind the wall or drywall and between the pair of studs 110.

Stud supports 110, wall studs 110, or studs 110, are vertical members in light frame construction techniques called balloon framing and platform framing of a building's wall, also known as "stick and platform," "stick and frame," or "stick and box" construction colloquially. The 'sticks,' or studs 110, carry the vertical loads, and rectangular platforms surrounding the studs 110, made of floor joists, headers and sub-floors, hold the outward forces in check and keep the wall in parallel and from bulging. Studs 110 may be made of wood, usually 2×4 or 2×6 dimensional lumber. In North America, studs are typically placed a distance $d_1$ of approximately 16 inches (400 mm) ±1 inch (±25 mm) from each other's center, but sometimes also at a distance $d_1$ of 12 inches (300 mm) ±1 inch (±25 mm), or a distance $d_1$ of 24 inches (600 mm) ±1 inch (±25 mm).

In one embodiment, studs 110 are made of steel with a variety of widths, such as a first width $W_1$ of 1.875 inches (47.5 mm) ±0.25 inches (±6 mm) for an exterior stud 110, and a second width $W_2$ of 1.25 inches (31.75 mm) ±0.25 inches (±6 mm) for an interior stud 110. Studs 110 may have additional widths as well, such as 1.625 inches (41.3 mm) ±0.25 inches (±6 mm), 2.50 inches (63.5 mm) ±0.25 inches (±6 mm), 3.625 inches (92 mm) ±0.25 inches (±6 mm), 4.0 inches (101.6 mm) ±0.25 inches (±6 mm), and 6 inches (152.4 mm) ±0.25 inches (±6 mm).

Figure 5:
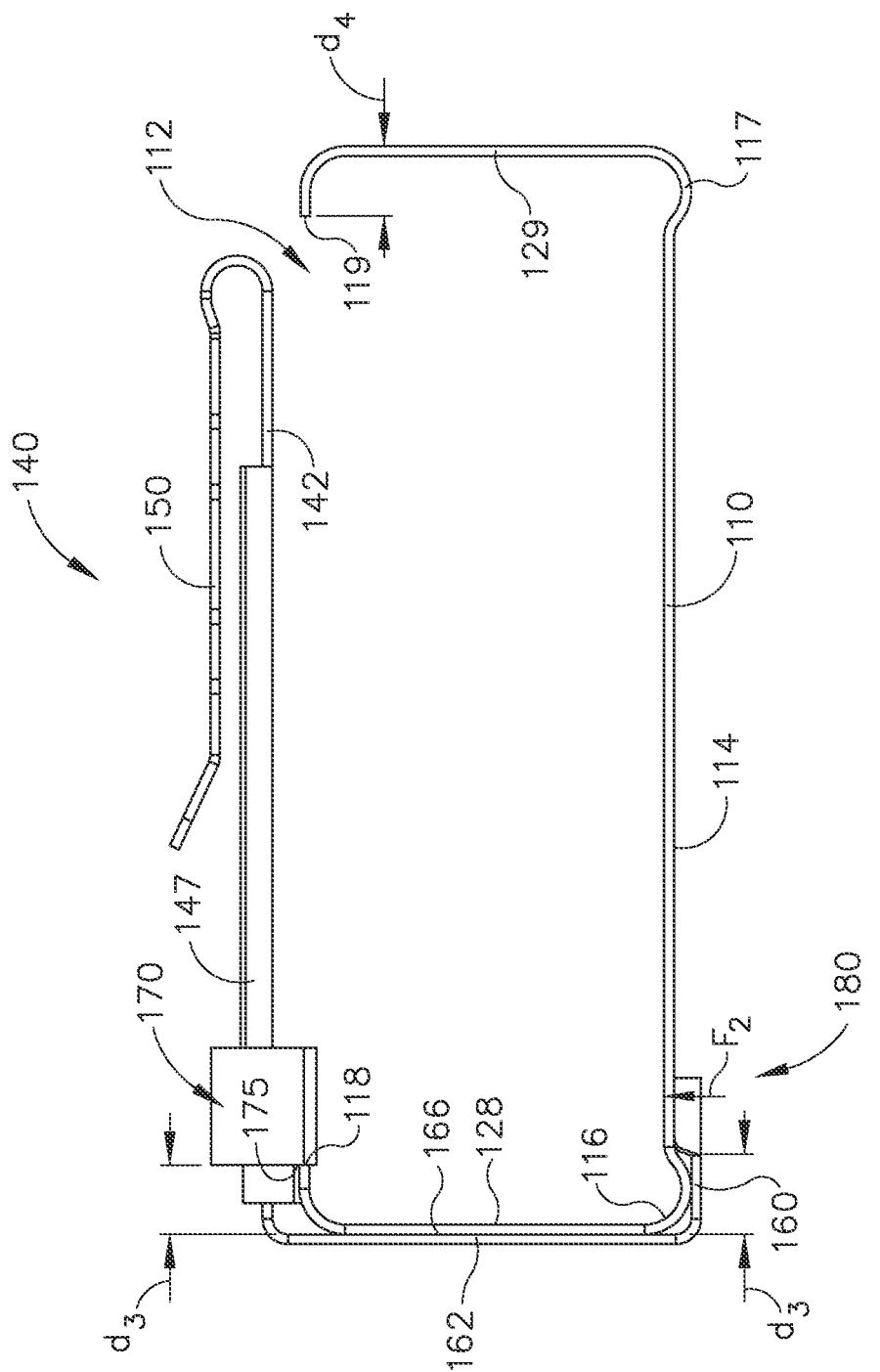
FIG. 5 depicts a second side view of the first engaging tab shown in FIG. 2 connected with a stud in a first manner, in accordance with one embodiment.
Figure 6:
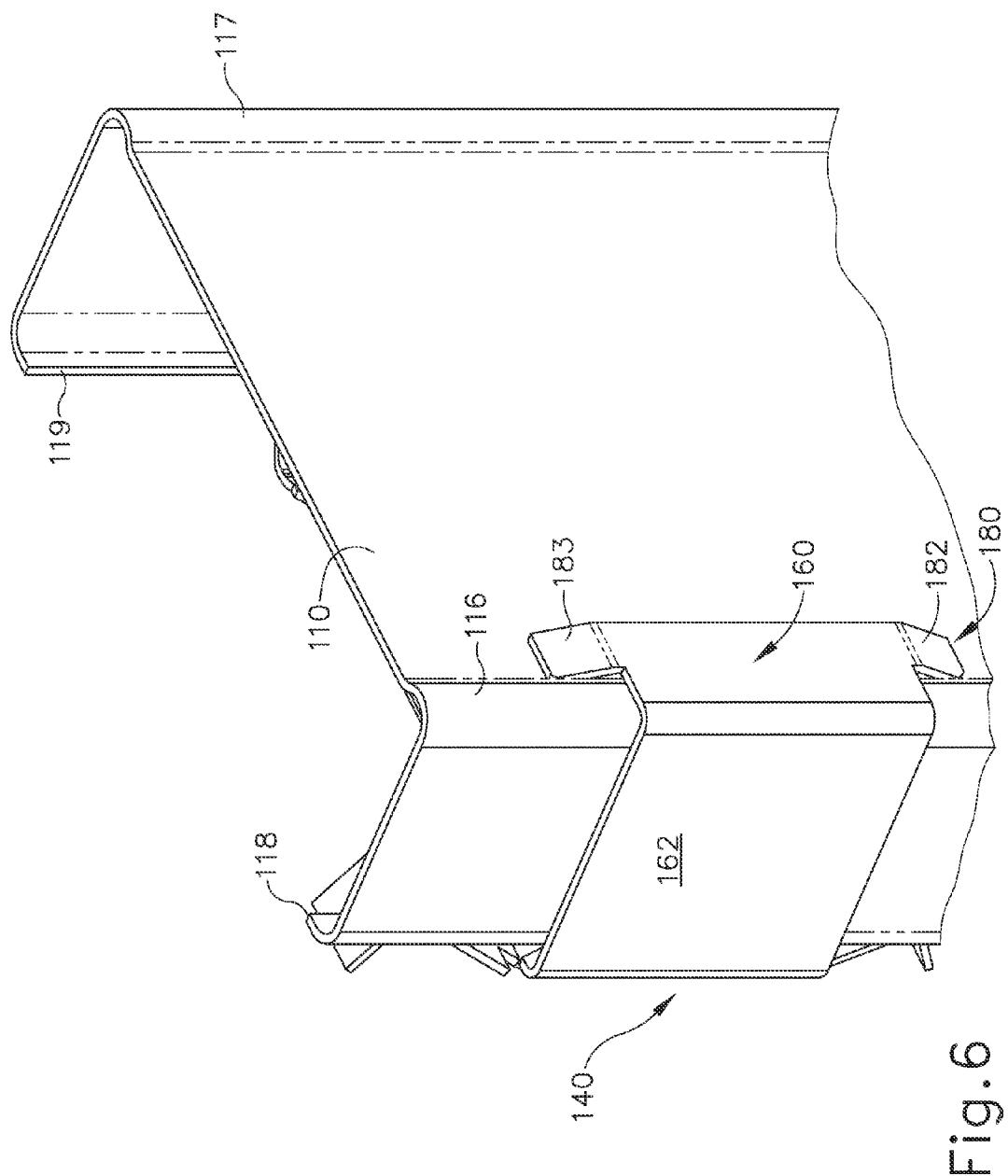
FIG. 6 depicts a first perspective view of the first engaging tab shown in FIG. 2 connected with a stud in a first manner, in accordance with one embodiment.
Figure 7:
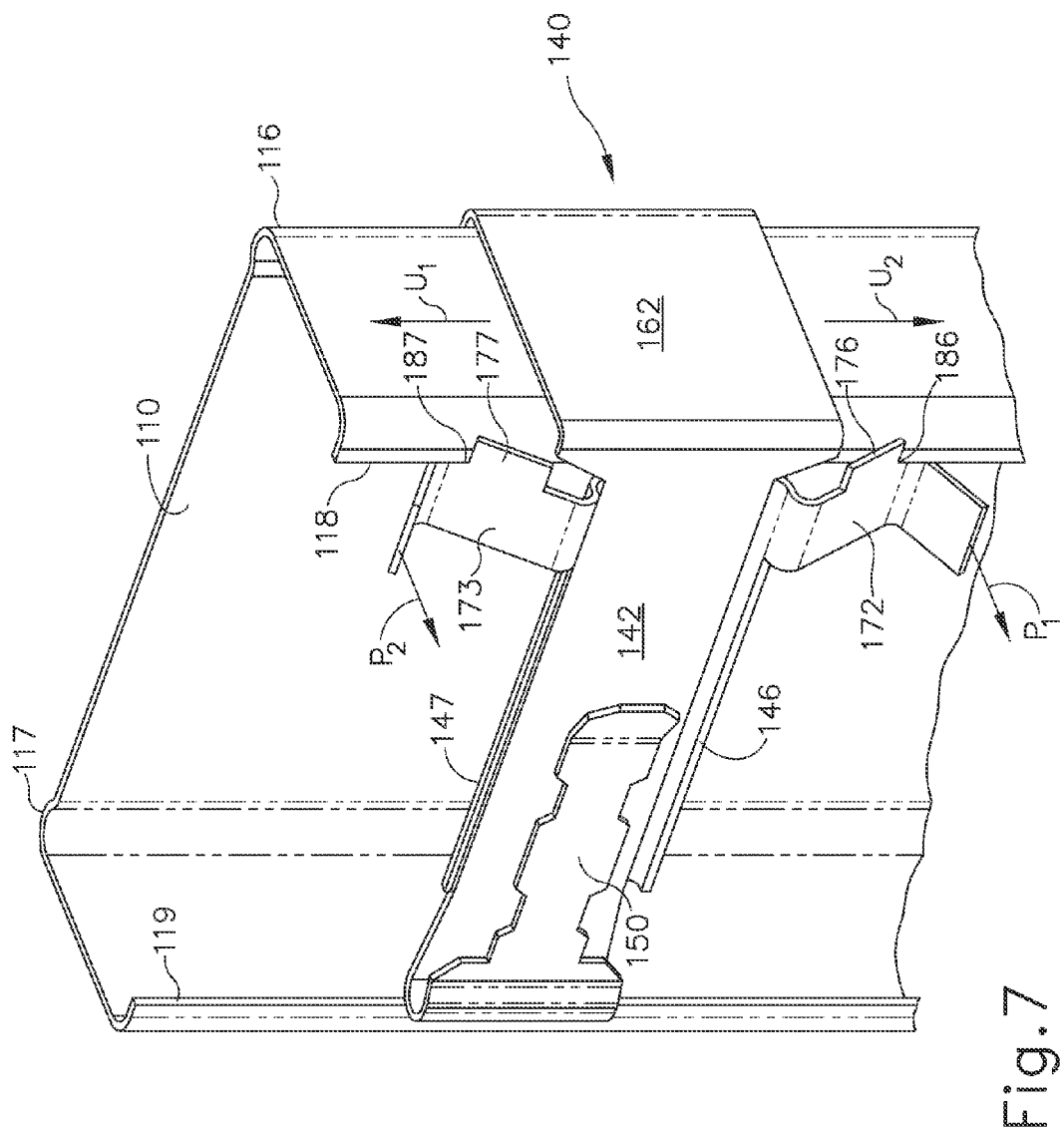
FIG. 7 depicts a second perspective view of the first engaging tab shown in FIG. 2 connected with a stud in a first manner, in accordance with one embodiment.

With reference to FIGS. 5 and 8, steel studs 110 each include an open face 112, a closed face 114 and a pair of side faces 128, 129 extending from the closed face 114. Each stud 110 also includes a pair of opposing bulges 116, 117 formed on the closed face 114 a distance less than a distance $d_3$ from each side face 128, 129 and first and second edges 118, 119 extending a distance less than a distance $d_3$ from each side face 128, 129.

With reference to FIG. 1, electrical box support assembly 100 is mounted between and connected with a pair of studs 110, and includes a pair of first and second telescoping overlapping struts 120, 130 and a pair of first and second engaging tabs 140, 190 detachably coupled with each end 124, 134 of the pair of first and second telescoping overlapping struts 120, 130. Second telescoping strut 130 overlaps first telescoping strut 120, as first telescoping strut 120 slides underneath and telescopes out from second telescoping strut 130. By making the first and second struts 120, 130 telescoping, the combined length $L_1$ of the struts 120, 130 can be varied to match the distance $d_1$ between the pair of studs 110, and allowing for easier mounting of the electrical box support assembly 100 with the studs 110. Each telescoping strut 120, 130 has a face 122, 132, respectively, to which the electrical box 102 may be secured. Preferably, each face 122, 132 includes a mounting device, such as an opening 126 or clip, through which the electrical box 102 may be secured.

In one embodiment, first and second engaging tabs 140, 190 are detachably coupled with each end 124, 134 of the pair of first and second telescoping overlapping struts 120, 130 and are capable of coupling with a stud 110. Preferably, first and second engaging tabs 140, 190 are mirror images of each other, and as a result, for simplicity only the structure of first engaging tab 140 will be discussed herein, as the structure of the second engaging tab 190 would be duplicative since mirror images both contain the same or similar elements. With reference to FIGS. 2-12, shown are various views of first engaging tab 140.

First engaging tab 140 includes a first engagement member 142 facing a second engagement member 160, a side engagement member 162 connecting the first and second engagement members 142, 160 together, and a first compressible member 170 extending from either the first engagement member 142 or the second engagement member 160. First engagement member 142 and second engagement member 160 straddle opposing sides of stud 110 and form a U-shaped member along with side engagement member 162 in order to warp around stud 110 so as to better secure the electrical box support assembly to the stud 110. Preferably, each engaging member 142, 160, 162 includes a generally flat face 143, 161, 163, respectively, which preferably engages or partially or fully rests against a respective side or feature of the stud 110, as shown in FIGS. 2, 5, and 8.

Figure 2:
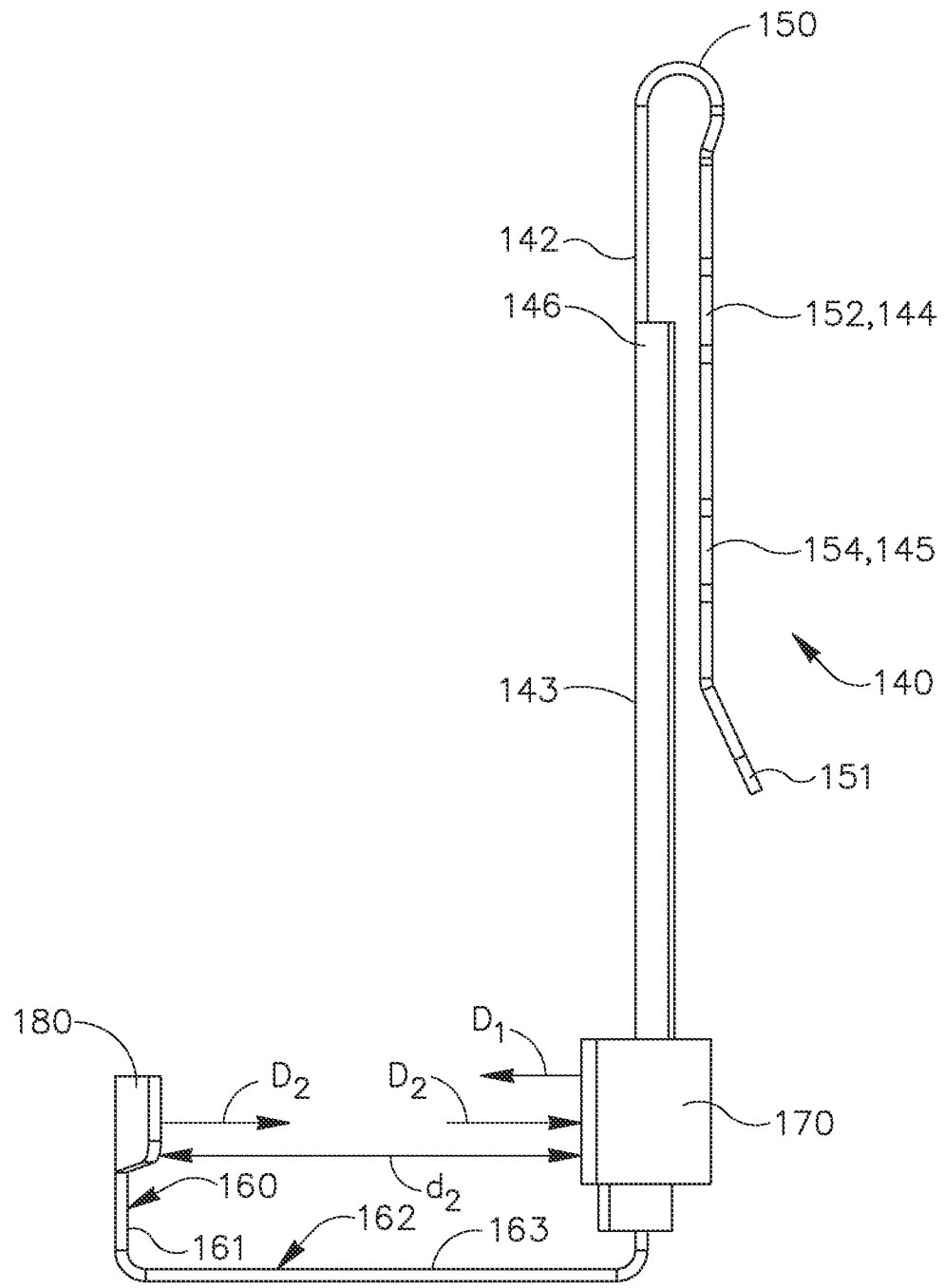
FIG. 2 depicts a first side view of a first engaging tab for the electrical box support assembly shown in FIG. 1 for mounting an electrical box between a pair of studs, in accordance with one embodiment.
Figure 3:
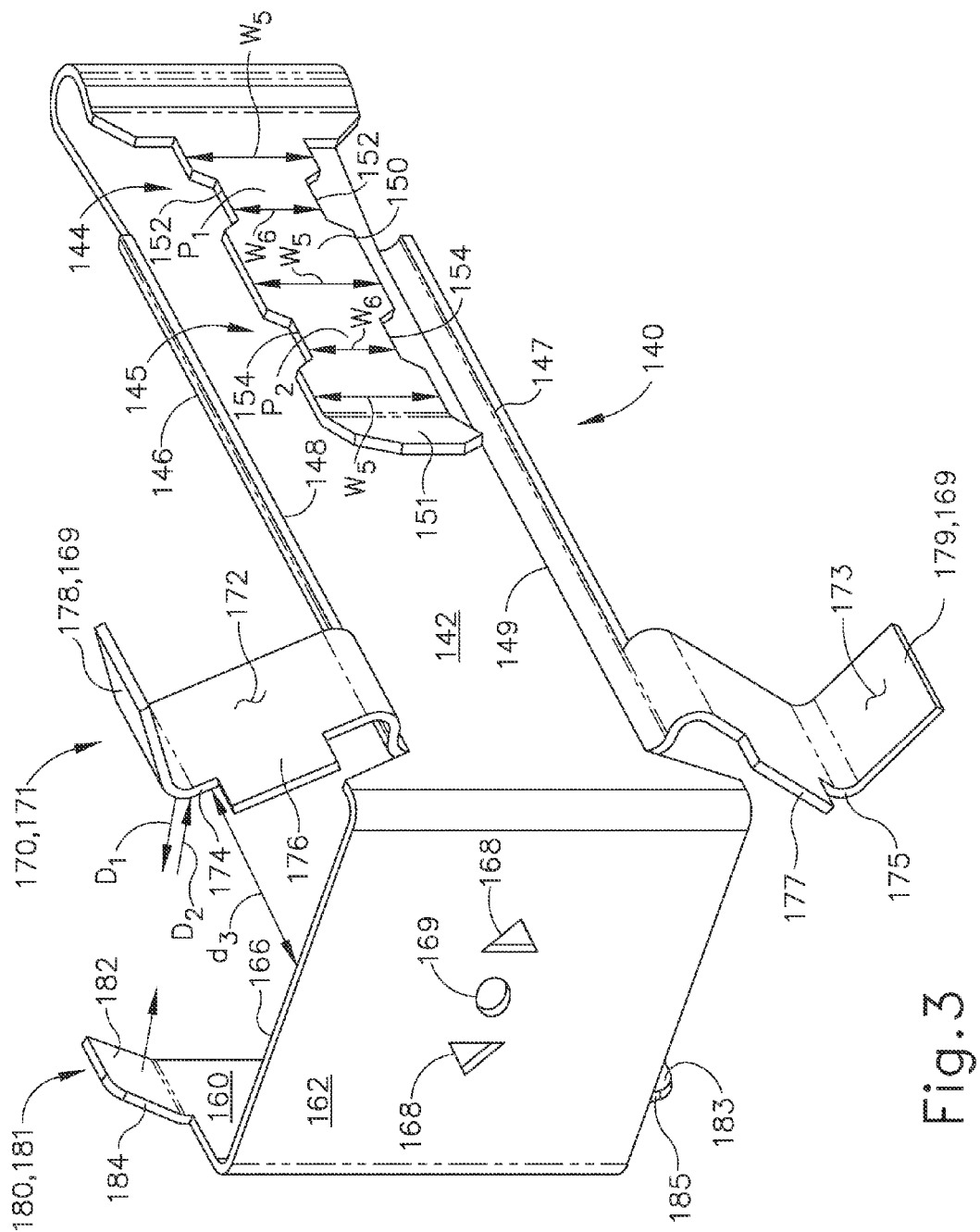
FIG. 3 depicts a first perspective view of the first engaging tab shown in FIG. 2 for mounting an electrical box between a pair of studs, in accordance with one embodiment.

With reference to FIGS. 2 and 3, in one embodiment, first compressible member 170 extends in a first direction $D_1$ from the first engagement member 142 towards the second engagement member 160 and the first compressible member 170 is compressible in a second direction $D_2$ opposite that of the first direction $D_1$. Compressible member 170 is any type of compressible device or member which can be compressed and upon compression, which applies a force $F_1$, as shown in FIG. 8, in a direction which is opposed to that of the direction in which the member 170 is compressed. Preferably, a distance $d_2$ between the compressible member 170 and the nearest point of member 162 is less than the width $W_1$ or $W_2$ of the stud 110. As a result, during installing of engaging tab 140 around stud 110, as shown in FIG. 8, compressible member 170 is compressed in a direction $D_2$ and applies a force $F_1$ in a direction $D_1$ which is opposed to direction $D_2$ against the stud 110. Preferably, force $F_1$ is greater than, and preferably much greater than, the weight of the electrical box support assembly 100, allowing for the engaging tab 140 to connect with and engage stud 110 and support the weight of the electrical box support assembly 100 along with engaging tab 190. In one embodiment, an additional fastening member, such as a screw or nail, is used to further secure engaging tab 140 to stud 110. By using a u-shaped engaging tab 140 having a pair of opposing engagement members 142, 160, and by having a compressible member 170 extending from one of the opposing engagement members 142, 160 and towards another of the opposing engagement members 142, 160, it is possible to readily mount and easily secure the electrical box support assembly 100 to any interior or exterior surface of a metal stud 110, or the exterior of a wood stud 110, preferably without the use of additional fasteners.

Figure 23:
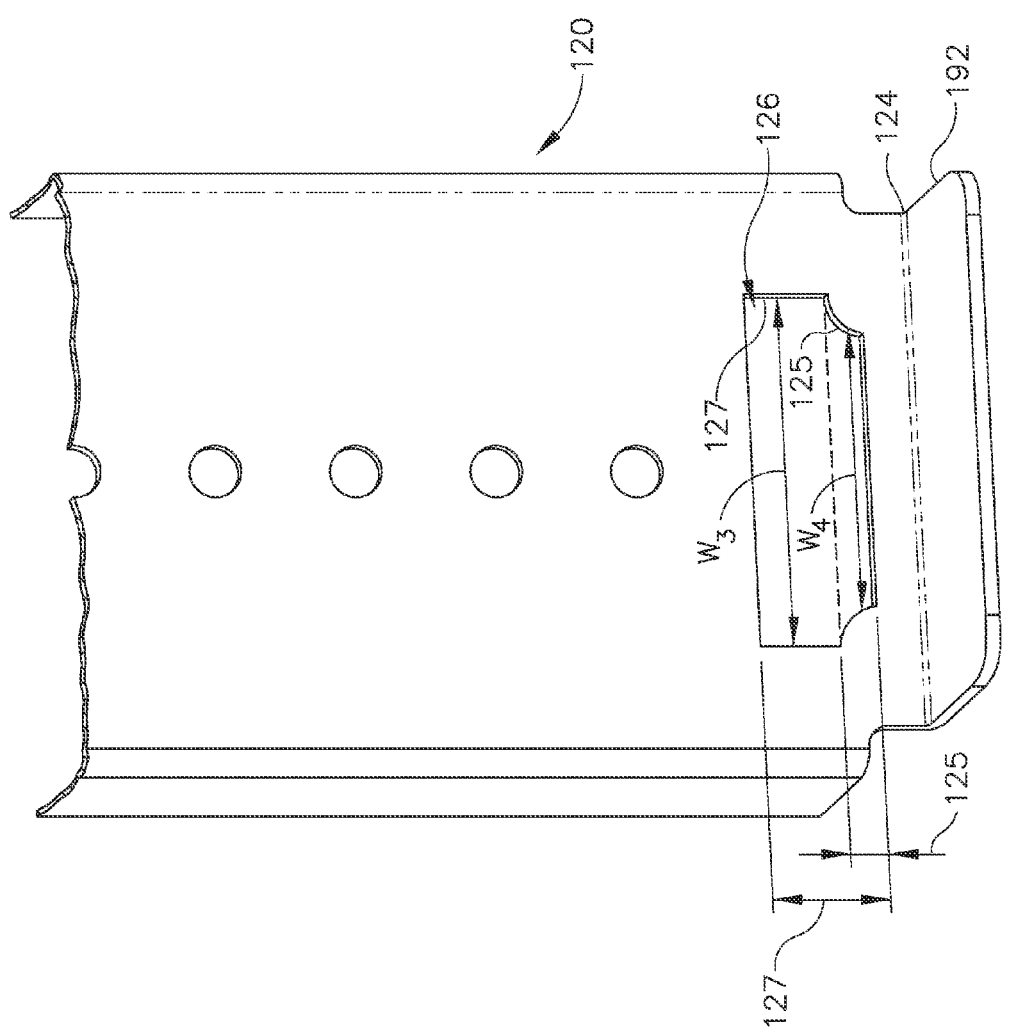
FIG. 23 depicts a perspective view of a first telescoping overlapping strut of the electrical box support assembly shown in FIG. 1 for mounting an electrical box between a pair of studs, in accordance with one embodiment.
Figure 24:
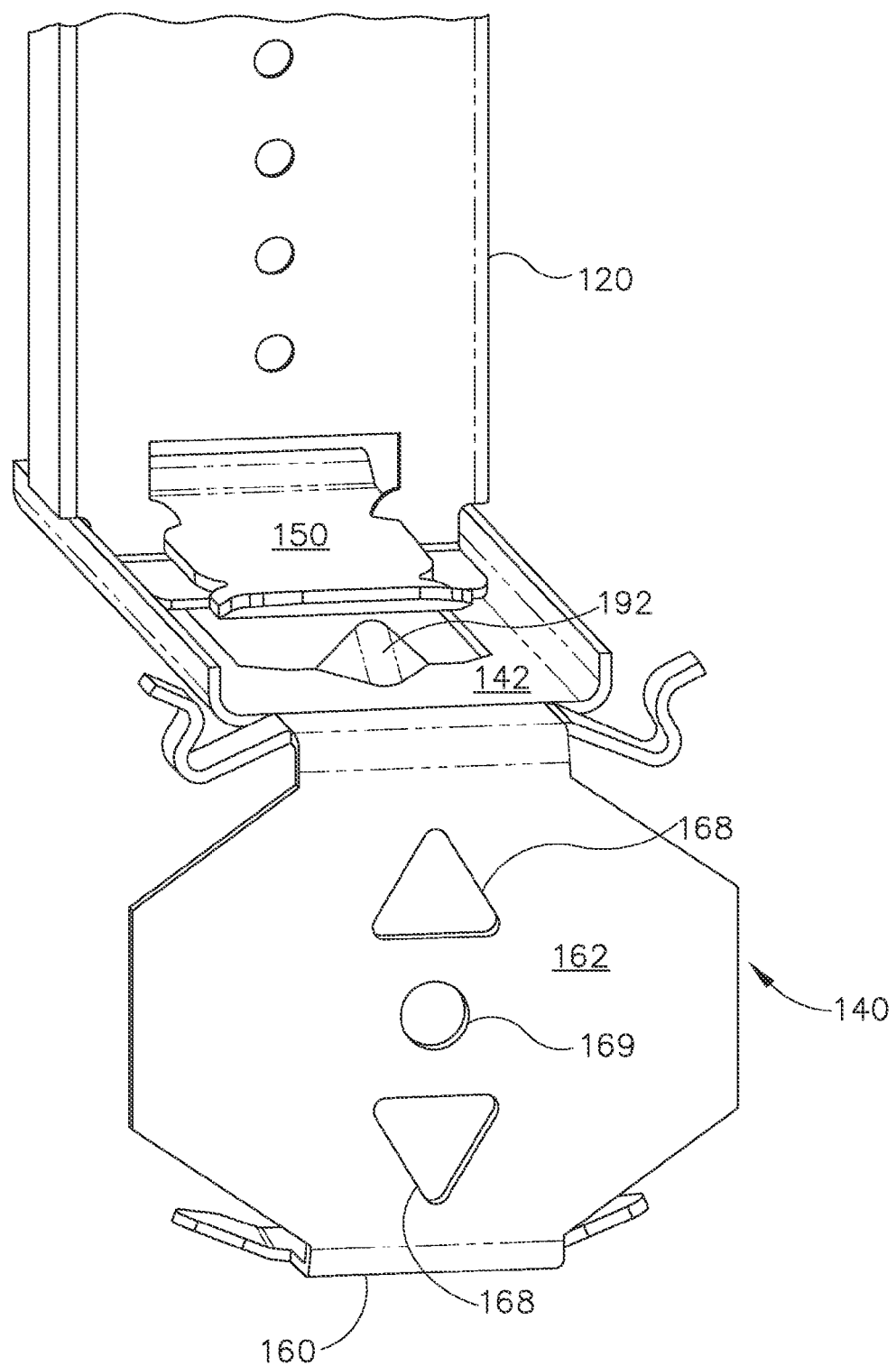
FIG. 24 depicts a perspective view of a first telescoping overlapping strut of the electrical box support assembly shown in FIG. 1 connected with a first engaging tab, in accordance with one embodiment.

With reference to FIGS. 3 and 23-24, each end 124, 134 of the pair of telescoping overlapping struts 120, 130, respectively, may be detachably coupled at one of two positions, $P_1$ or $P_2$, on first engaging tab 140 in order to accommodate electrical boxes 102 of varying depths. As used herein, the term detachably coupled or detachably secured refers to coupling or securing a first member to a second member in a manner in which the two members are designed to be unfastened or disconnected from each other without damage to either member. This allows for a user to disconnect or unfasten the two members from each other without damage so that a user may service the two members. Detachable couplings may include a snap-fit coupling, a frictionally engaging coupling which includes members which frictionally engage each other, a threaded coupling, a magnetic coupling, and a mechanical coupling such as a hook and loop type fastener, or any other type of mechanical arrangement. Preferably, the first engaging tab 140 includes a pair of first and second coupling members 144, 145 which may be coupled with a respective opening or coupling member 192 formed on or near each end 124, 134 of the struts 120, 130, as shown in FIG. 23.

With reference to FIGS. 3 and 23-24, in one embodiment, coupling members 144, 145 are formed on an engagement tongue 150 connected with the first engagement member 142, whereupon each coupling member 144, 145 forms a pair of inwardly facing notches 152, 154, respectively. Each pair of inwardly facing notches 152, 154 engages and is detachably coupled with an engagement opening 126. Preferably, as shown in FIG. 23, the engagement opening 126 is T-shaped and has a release portion 127 with a width $W_3$ and a locking portion 128 with a width $W_4$ which is less than the width $W_3$. In order to detachably couple an end 124 of strut 120 to engaging tab 140, engagement tongue 150 has a nominal width $W_5$, which is greater than $W_4$ but less than $W_3$, allowing the engagement tongue 150 to pass through the release portion 127. Each pair of inwardly facing notches 152, 154 causes reduces width of the engagement tongue 150 from the nominal width $W_5$ to a reduced width $W_6$. Since the reduced width $W_6$ is less than the width $W_4$ of the locking portion 125, either coupling member 144 or 145 is able to rest within the locking portion 125 and detachably couple the first engaging tab 140 to the first telescoping strut 120. Preferably, engagement tongue 150 is biased downwards and towards the first engaging member 142, biasing either coupling member 144 or 145 to rest within the locking portion 125. Preferably, engagement tongue 150 includes a bent flap 151 at an open end of the engagement tongue 150 for lifting the engagement tongue 150 upwards and away from the first engaging member 142, moving either coupling member 144 or 145 away from the locking portion 125 and into the release portion 127, allowing a user to detach the first telescoping strut 120 from the first engaging tab 140 or to reposition the first telescoping strut 120 from one position $P_1$ to a second position $P_2$.

With reference to FIGS. 3 and 23-24, in one embodiment, coupling members 144, 145 are formed on and extend from first engagement member 142, whereupon each coupling member 144, 145 forms a pair of curved V-shaped brackets 157, 158, respectively. Each curved V-shaped bracket 157, 158 engages and is detachably coupled with the engagement opening 126 and has a lip 164, 165, respectively, which a user may move up and away from the first engagement member 142 in order to release and decouple each V-shaped bracket 157, 158 from the engagement opening 126 and the stud 120.

With reference to FIGS. 3-12, in one embodiment, wherein at least one of and preferably each pair of engaging tabs 140, 190 further includes a second compressible member 180 extending from the second engagement member 160 in a second direction $D_2$ opposite that of the first direction $D_1$ and towards the first engagement member 142. Second compressible member 180 is any type of compressible device or member which can be compressed and upon compression, which applies a force $F_2$, as shown in FIG. 5, in a direction which is opposed to that of the direction in which the member 180 is compressed. Preferably, a distance $d_2$ between the second compressible member 180 and the nearest point of member 162 is less than the width $W_1$ or $W_2$ of the stud 110. As a result, during installing of engaging tab 140 around stud 110, as shown in FIG. 5, compressible member 180 is compressed in a direction $D_1$ and applies a force $F_2$ in a direction $D_2$ which is opposed to direction $D_1$ against the stud 110. Preferably, force $F_2$ is greater than, and preferably much greater than, the weight of the electrical box support assembly 100, allowing for the engaging tab 140 to connect with and engage stud 110 and support the weight of the electrical box support assembly 100 along with engaging tab 190.

Figure 26:
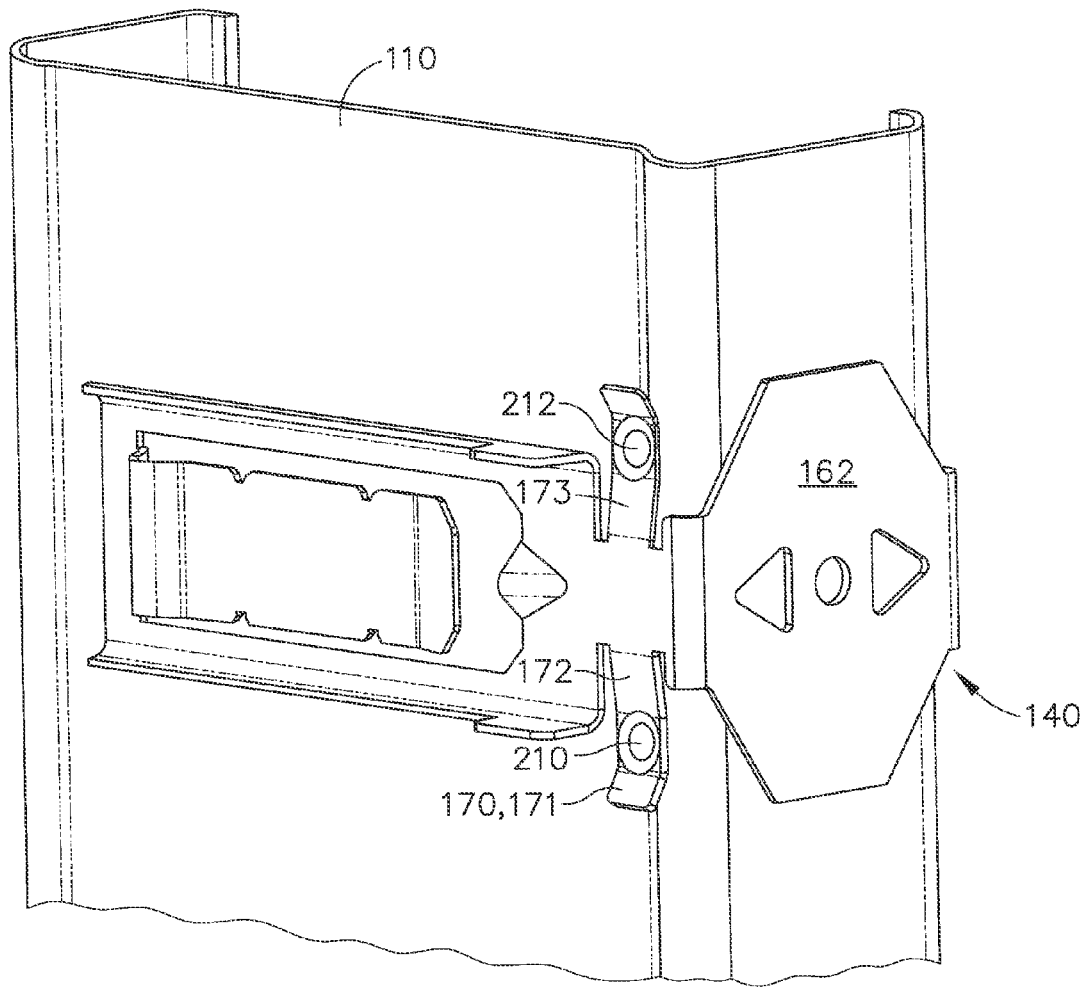
FIG. 26 depicts a second perspective view of the engaging tab shown in FIG. 25 connected with a stud in a first manner, in accordance with one embodiment.

With reference to FIGS. 3, 4, 7, and 10, in one embodiment the first compressible member 170 forms a compressible winged structure 171 having a pair of winged members 172, 173 which slant inwardly in the first direction $D_1$. Preferably, each winged member 172, 173 is V-shaped and connected with the first engagement member 142. Preferably, each winged member 172, 173 includes a trailing edge 174, 175 respectively, which is a distance $d_3$ from an inward surface 166 of the side engagement member 162. With reference to FIG. 26, in one embodiment, each winged member 172, 173 includes an indentation or dimple 210, 212 formed in and extruded from each winged member 172, 173. Preferably, each indentation or dimple 210, 212 is semi-spherically shaped or semi-ovoidally shaped. Each indentation or dimple 210, 212 is able to better apply a force $F_1$ to the stud 110 in order to more firmly mate the first engaging tab 140 with the stud 110.

Figure 27:
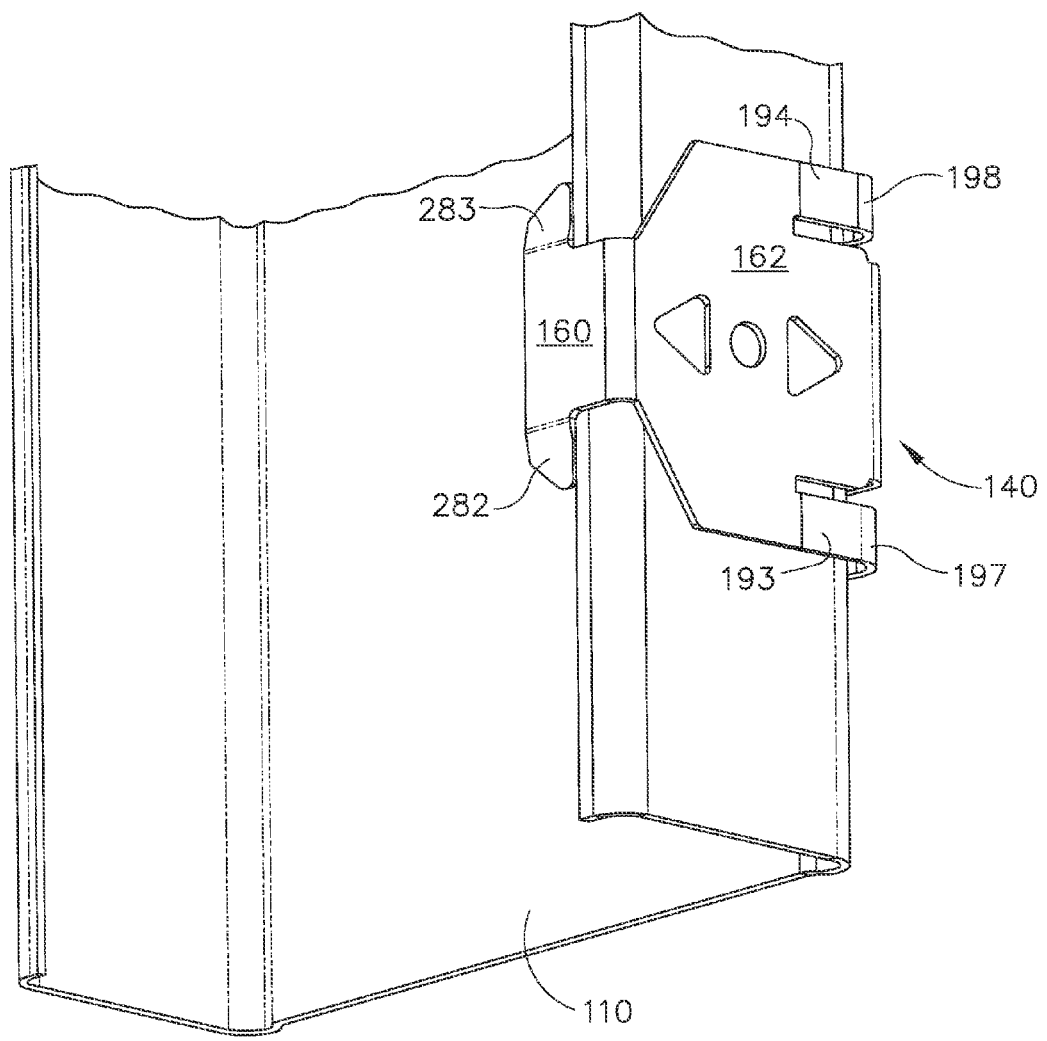
FIG. 27 depicts a first perspective view of an engaging tab connected with a stud in a first manner, in accordance with one embodiment.
Figure 28:
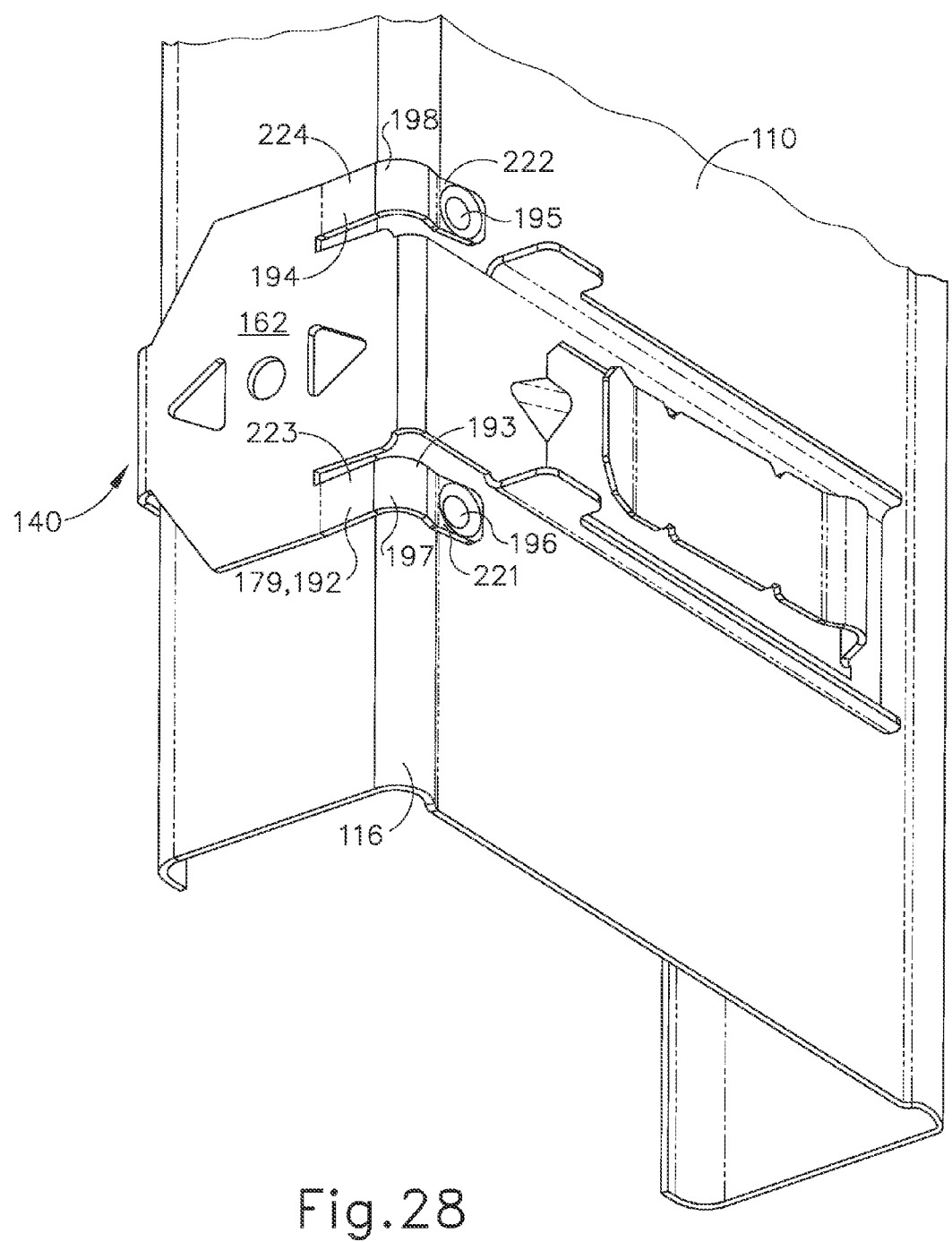
FIG. 28 depicts a second perspective view of the engaging tab shown in FIG. 27 connected with a stud in a first manner, in accordance with one embodiment.

With reference to FIGS. 27 and 28, in one embodiment, the first compressible member 170 forms at least one, and preferably a pair of, compressible fingers 193, 194 each of which extend from side engagement member 162, and each of which form a generally right-angle bend 197, 198, respectively, in order to wrap around either the first bulge 116 or the second bulge 117, or to wrap around a corner of the stud 110 nearest the first edge 118 or the second edge 119. Preferably, each compressible finger 193, 194 forms an indentation 195, 196 formed in and extruded from each compressible fingers 193, 194, preferably along a grasping portion 221, 222, connected with the corner portion 197, 198, respectively, which is in turn connected with an extending portion 223, 224 which is in turn connected with the side engagement member 162. Preferably, each indentation 195, 196 is semi-spherically shaped or semi-ovoidally shaped. Each indentation 195, 196 is able to better apply a force $F_1$ to the stud 110 in order to more firmly mate the first engaging tab 140 with the stud 110.

With reference to FIGS. 5 and 8, preferably, each stud 110 forms a bulge 116, 117 at a corner of the stud 110 and extending away from a flat surface formed on a closed face 114 of the stud 110 and a pair of edges 118, 119 which extend a distance of less than $d_3$ from each side face 128, 129 at the open face 112. Preferably, each bulge 116, 117 has a length of less than $d_3$, so that each trailing edge 174, 175 of each winged member 172, 173 may catch and rest against a bulge 116 or 117 or an edge 118 or 119, depending on how the first engaging tab 140 is mounted to the stud 110, further securing the electrical box support assembly 100 to the stud 110.

Figure 4:
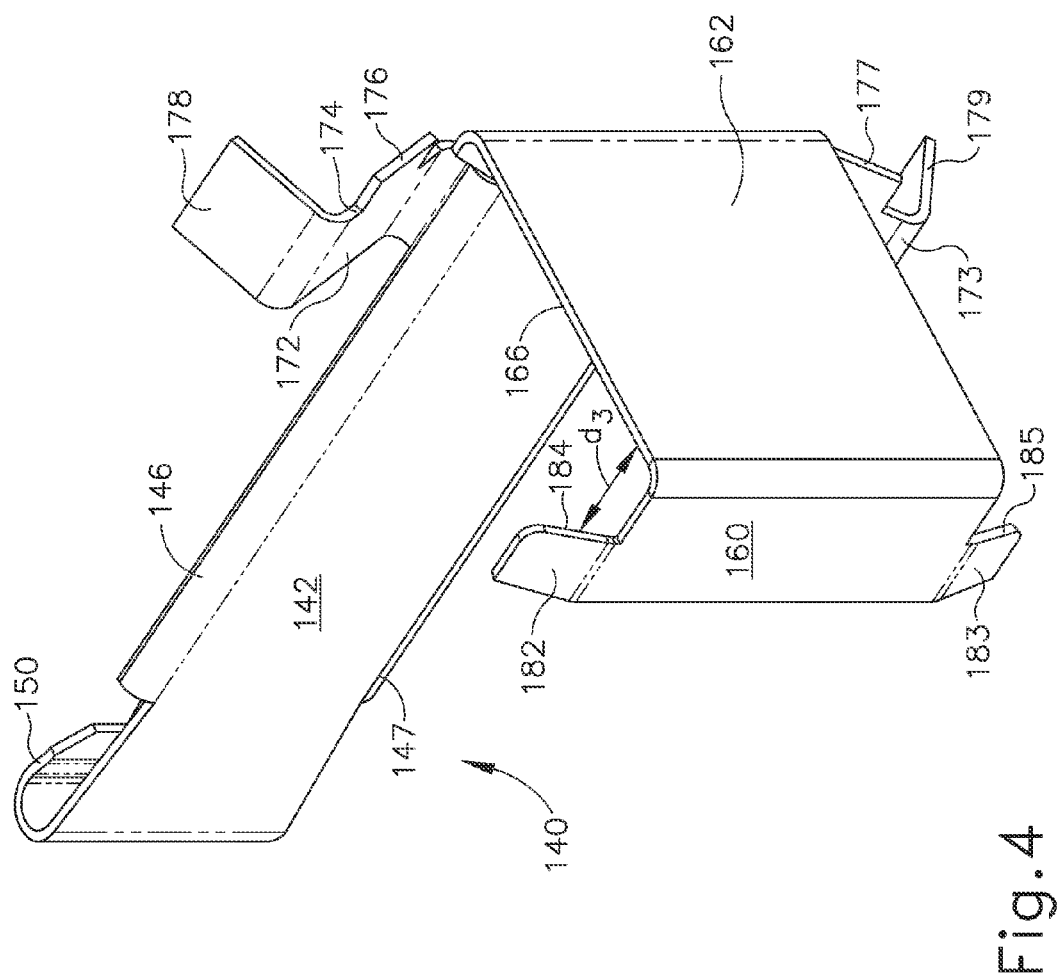
FIG. 4 depicts a second perspective view of the first engaging tab shown in FIG. 2 for mounting an electrical box between a pair of studs, in accordance with one embodiment.
Figure 25:
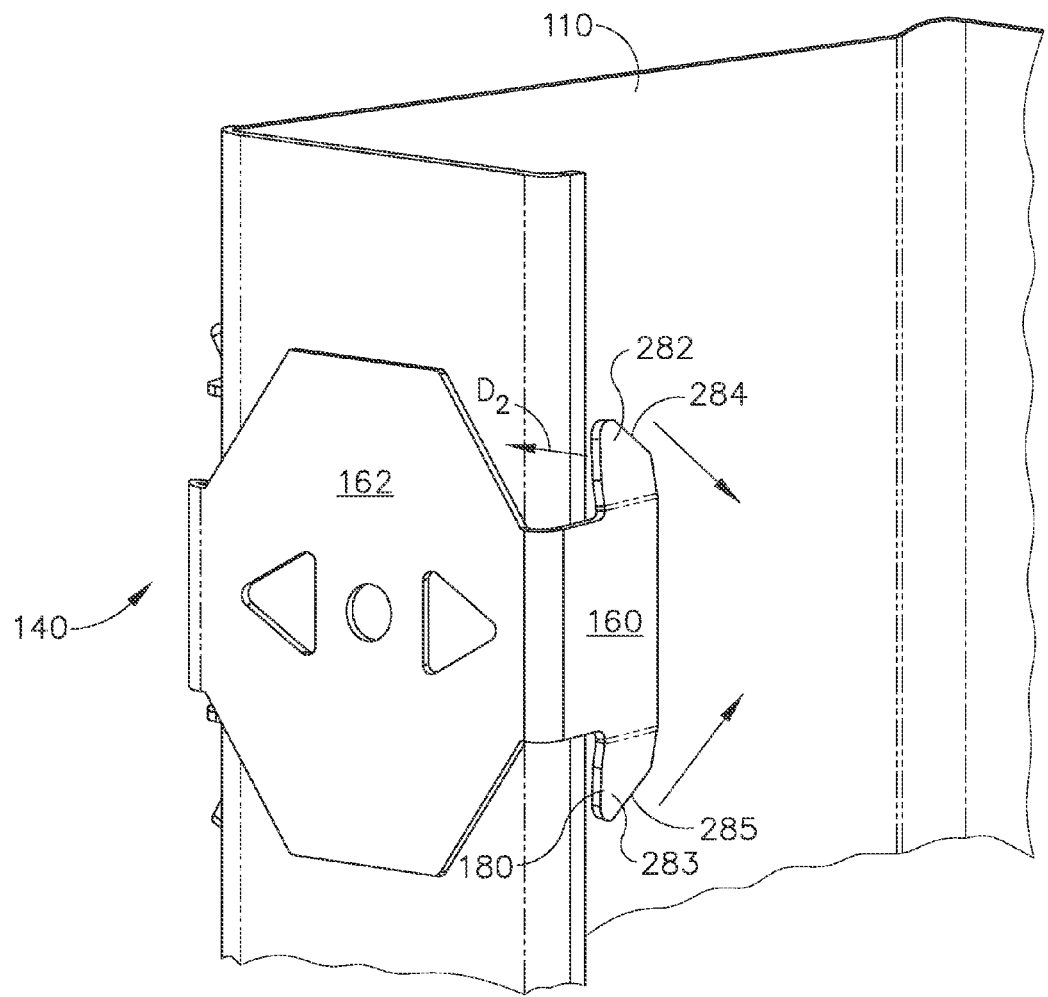
FIG. 25 depicts a first perspective view of an engaging tab connected with a stud in a first manner, in accordance with one embodiment.

With reference to FIG. 4, in one embodiment, the second compressible member 180 includes a pair of winged members 182, 183 which slant inwardly in the second direction $D_2$. Preferably, each winged member 182, 183 is V-shaped and connected with the second engagement member 162. In one embodiment, each winged member 182, 183 is simply just slanted inwardly, as shown in FIG. 4. Preferably, each winged member 182, 183 includes a trailing edge 184, 185 respectively, which is a distance $d_3$ from an inward surface 166 of the side engagement member 162. With respect to FIGS. 25 and 27, in one embodiment, the second compressible member 180 includes a pair of winged members 282, 283 which slant inwardly in the second direction $D_2$ and which include slanted upper edges 284, 285 which slant down towards and behind second engagement member 160, as shown in FIG. 25.

With reference to FIGS. 5 and 8, preferably, each stud 110 forms a bulge 116, 117 at a corner of the stud 110 and extending away from a flat surface formed on a closed face 114 of the stud 110 and a pair of edges 118, 119 which extend a distance of less than $d_3$ from each side face 128, 129 at the open face 112. Preferably, each bulge 116, 117 has a length of less than $d_3$, so that each trailing edge 184, 185 of each winged member 182, 183 may catch and rest against a bulge 116 or 117 or an edge 118 or 119, depending on how the first engaging tab 140 is mounted to the stud 110, further securing the electrical box support assembly 100 to the stud 110.

With reference to FIGS. 3, 4, 7, and 10, in one embodiment, each pair of winged members 172, 173 includes a tabbed member 176, 177 formed at and extending away from the trailing edge 174, 175. Each stud 110 forms an open face 112 between a pair of edges 118 and 119, and each edge 118 and 119 extends a distance $d_4$ from a side face 128, 129 of each stud 110. Since each edge 174, 175 is a distance $d_3$ from the inward surface 166, and since the distance $d_4$ is less than the distance $d_3$, each tabbed member 176, 177 and each trailing edge 174, 175 form a corner 186, 187 which traps an edge 118 or 119, depending on how the first engaging tab 140 is mounted to the stud 110, further securing the electrical box support assembly 100 to the stud 110.

With Reference to FIGS. 3 and 4, in one embodiment, the first engagement member 142 includes a pair of curved flanges 146, 147, each extending along opposing edges 148, 149 of first engagement member 142 and curving away from the second engagement member 160. The curved flanges 146, 147 are located on opposite sides of the first and second coupling members 144, 145 and aid in aligning and coupling the first telescoping strut 120 with the first engaging tab 140, as shown in FIG. 24.

Figure 14:
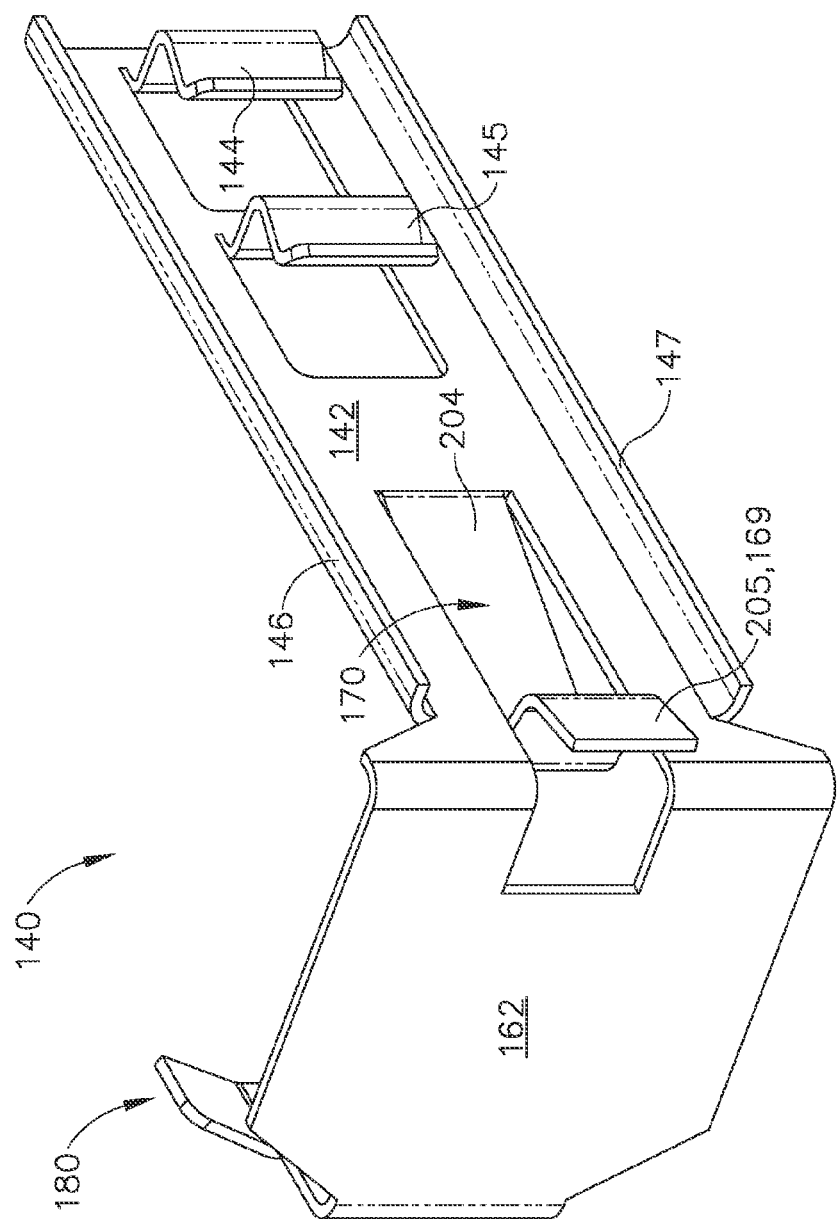
FIG. 14 depicts a second perspective view of the second engaging tab shown in FIG. 13 for mounting an electrical box between a pair of studs, in accordance with one embodiment.
Figure 15:
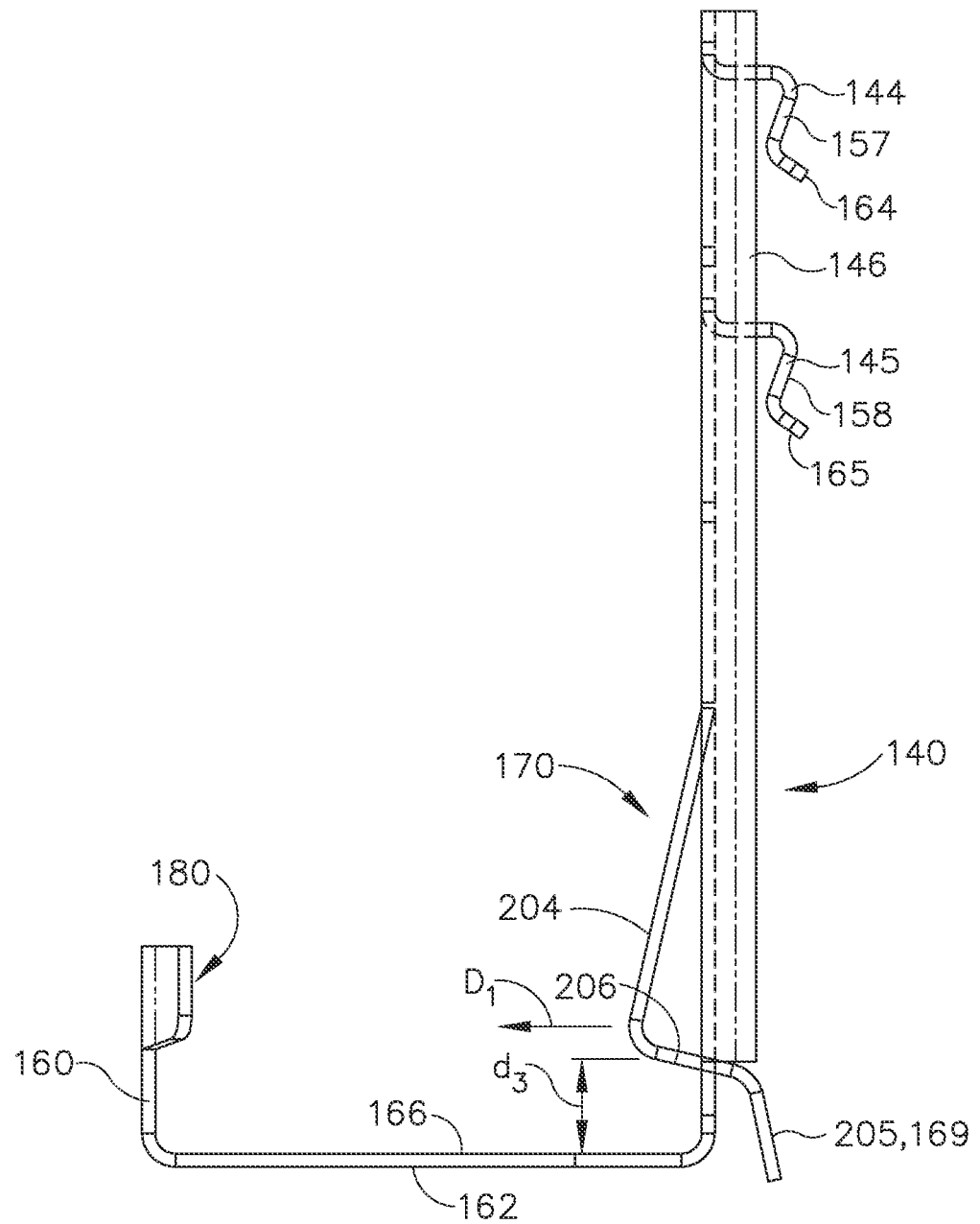
FIG. 15 depicts a first side view of the second engaging tab shown in FIG. 13 for mounting an electrical box between a pair of studs, in accordance with one embodiment.

With reference to FIGS. 3 and 14, in one embodiment, the first compressible member 170 includes a release tab 168 for moving the first compressible member 170 in the second direction $D_2$ and away from the stud 110. The release tab 168 aids a user in decoupling and removing the engaging tab 140 from or adjusting the engaging tab 140 against the stud 110.

Figure 16:
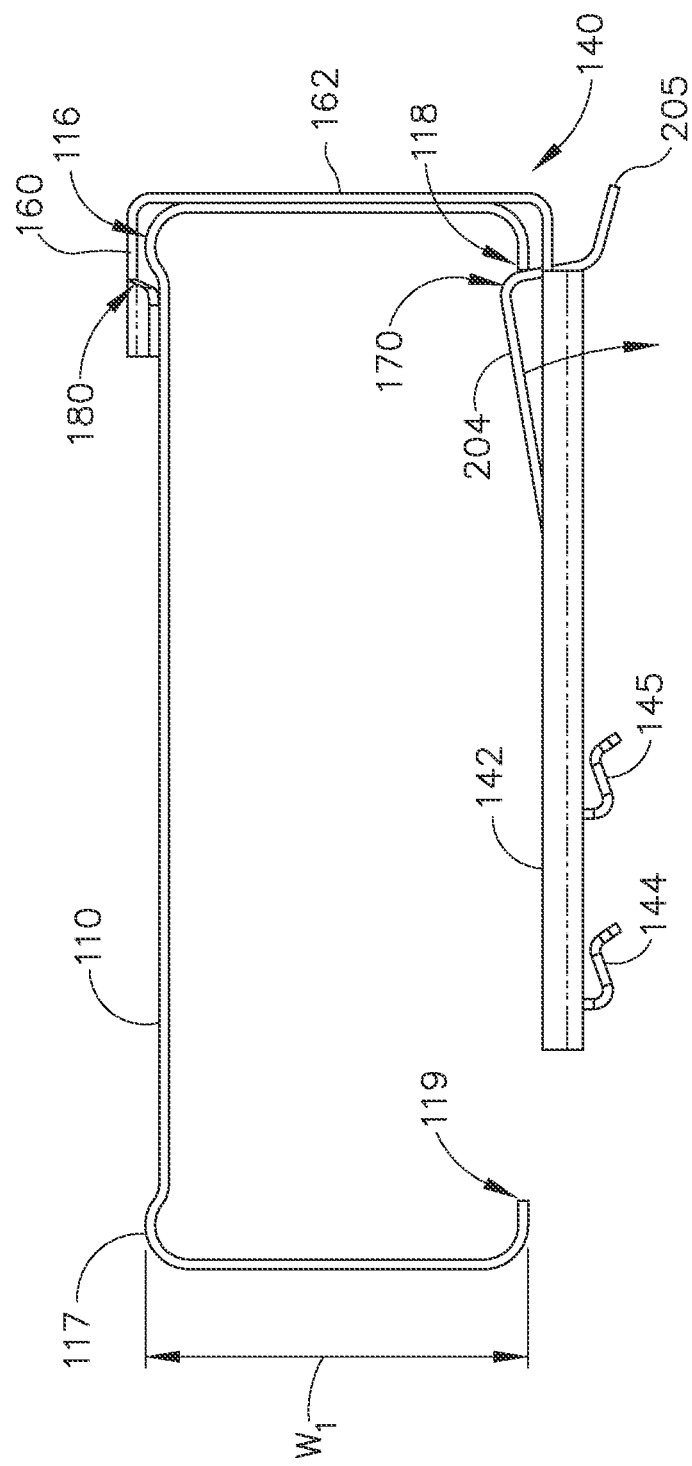
FIG. 16 depicts a second side view of the second engaging tab shown in FIG. 13 connected with a stud having a first width $W_1$ in a first manner, in accordance with one embodiment.
Figure 17:
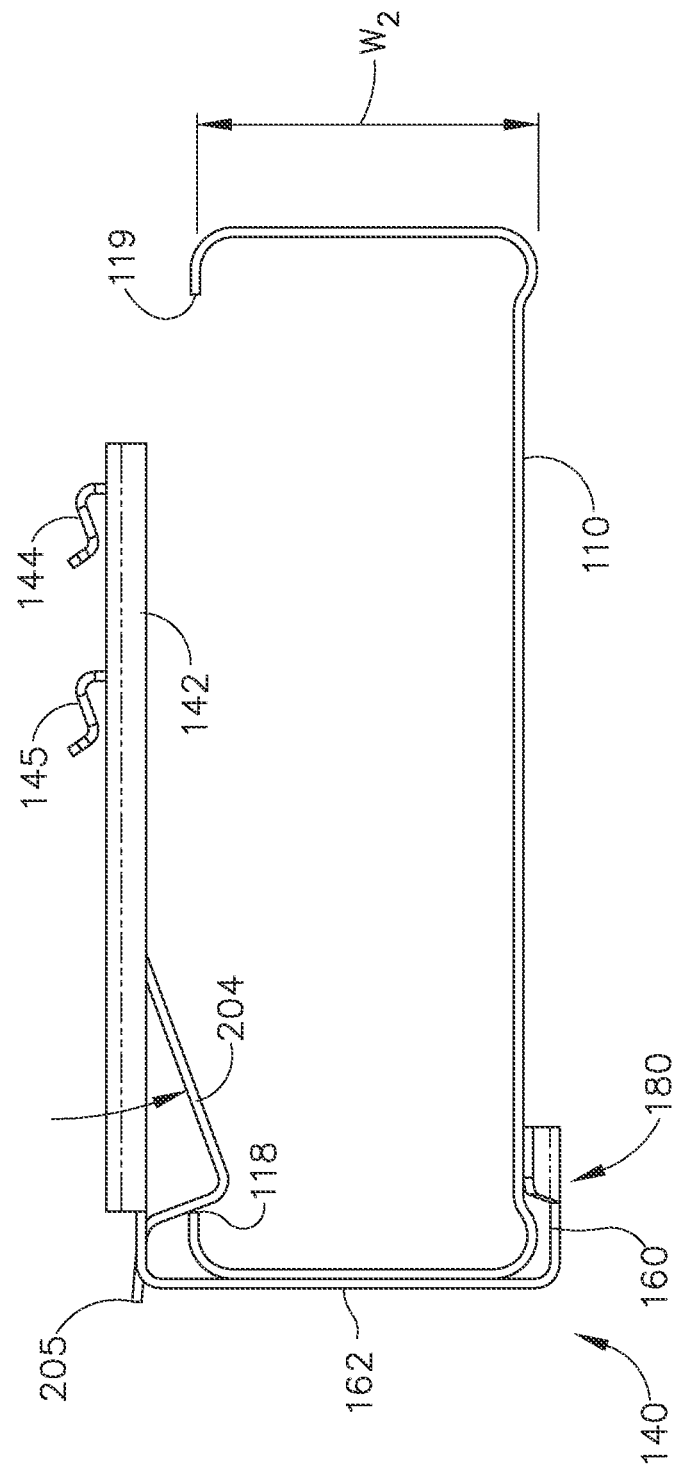
FIG. 17 depicts a second side view of the second engaging tab shown in FIG. 13 connected with a stud having a second width $W_2$ in a first manner, in accordance with one embodiment.
Figure 18:
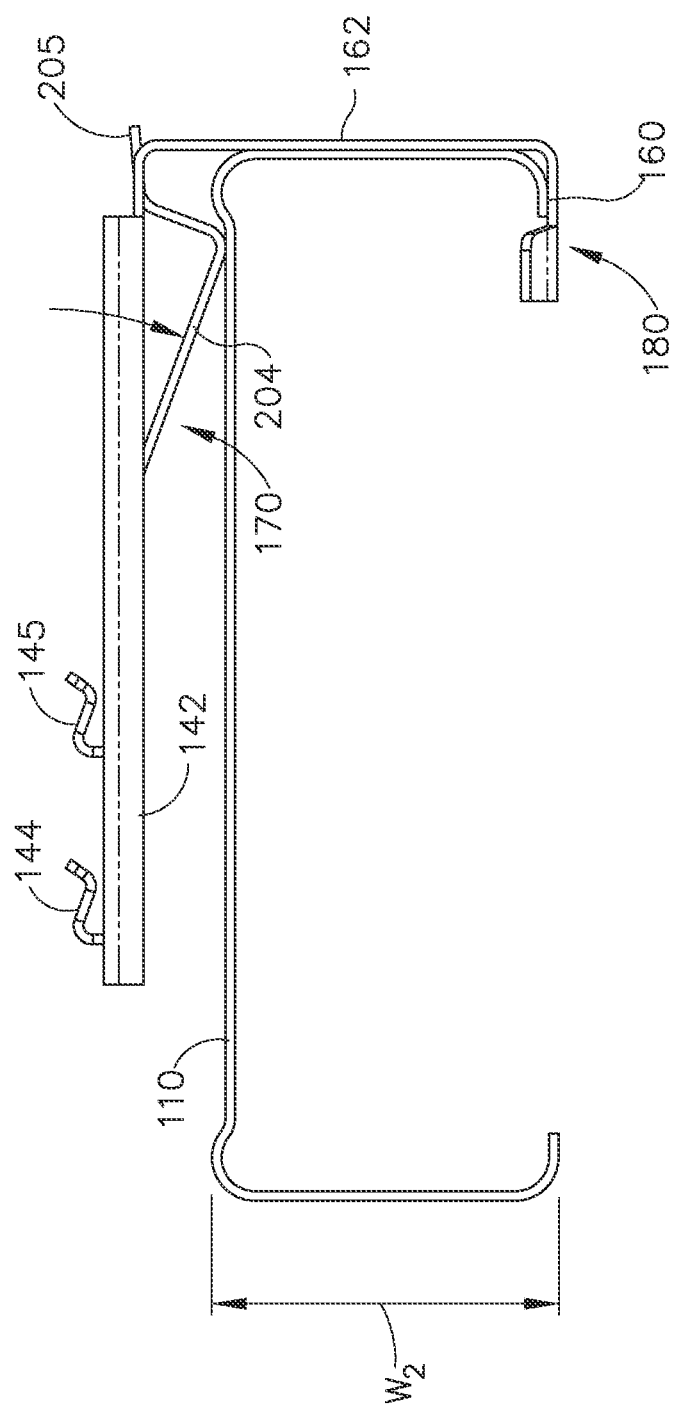
FIG. 18 depicts a side view of the second engaging tab shown in FIG. 13 connected with a stud having a second width $W_2$ in a second manner, in accordance with one embodiment.
Figure 19:
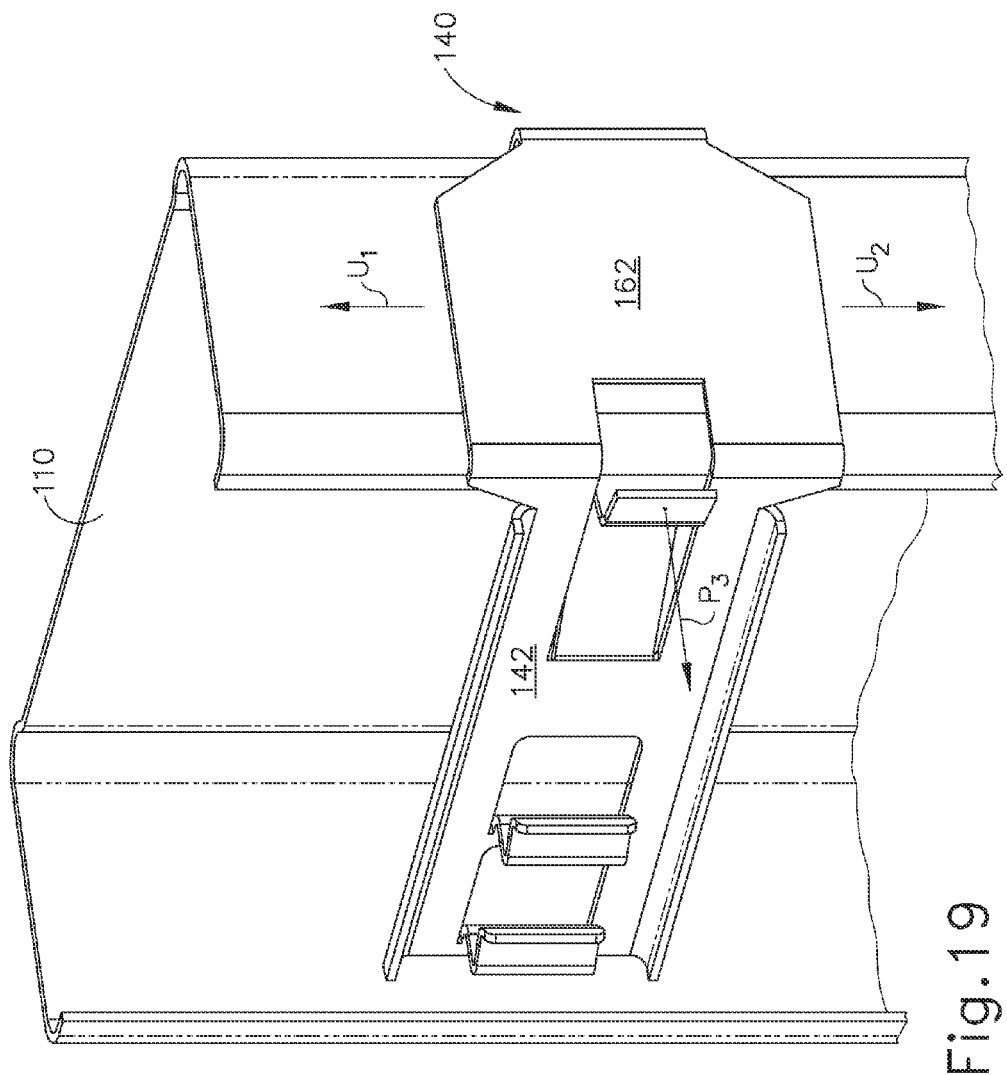
FIG. 19 depicts a first perspective view of the second engaging tab shown in FIG. 13 connected with a stud in a first manner, in accordance with one embodiment.
Figure 20:
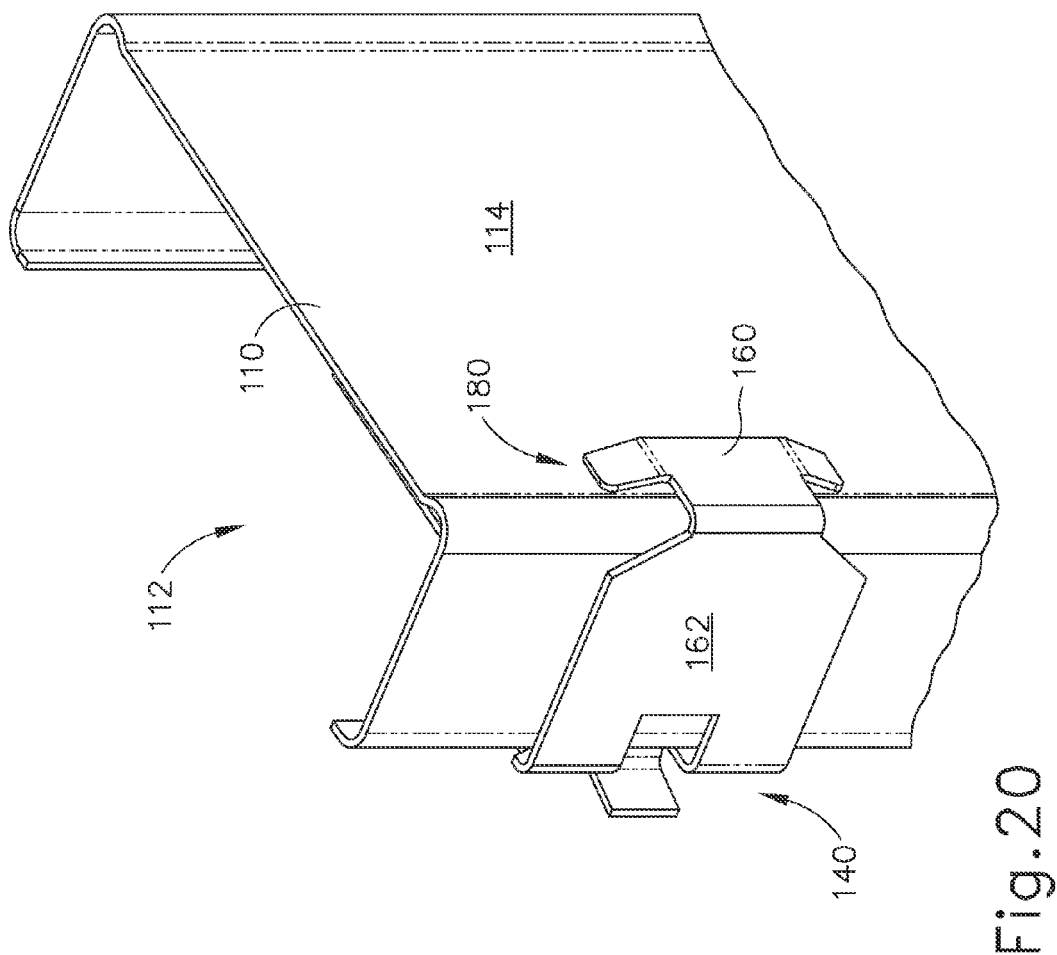
FIG. 20 depicts a second perspective view of the second engaging tab shown in FIG. 13 connected with a stud in a first manner, in accordance with one embodiment.
Figure 21:
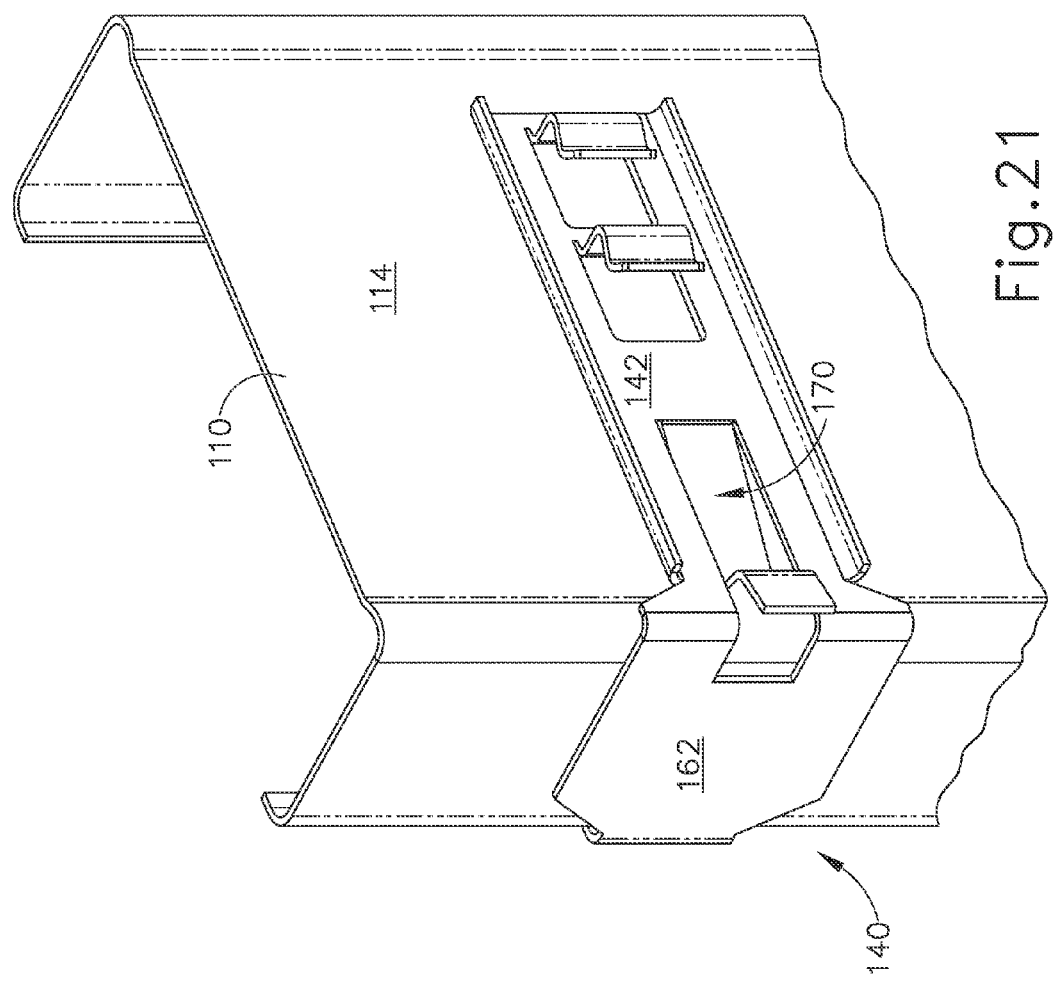
FIG. 21 depicts a first perspective view of the second engaging tab shown in FIG. 13 connected with a stud in a second manner, in accordance with one embodiment.
Figure 22:
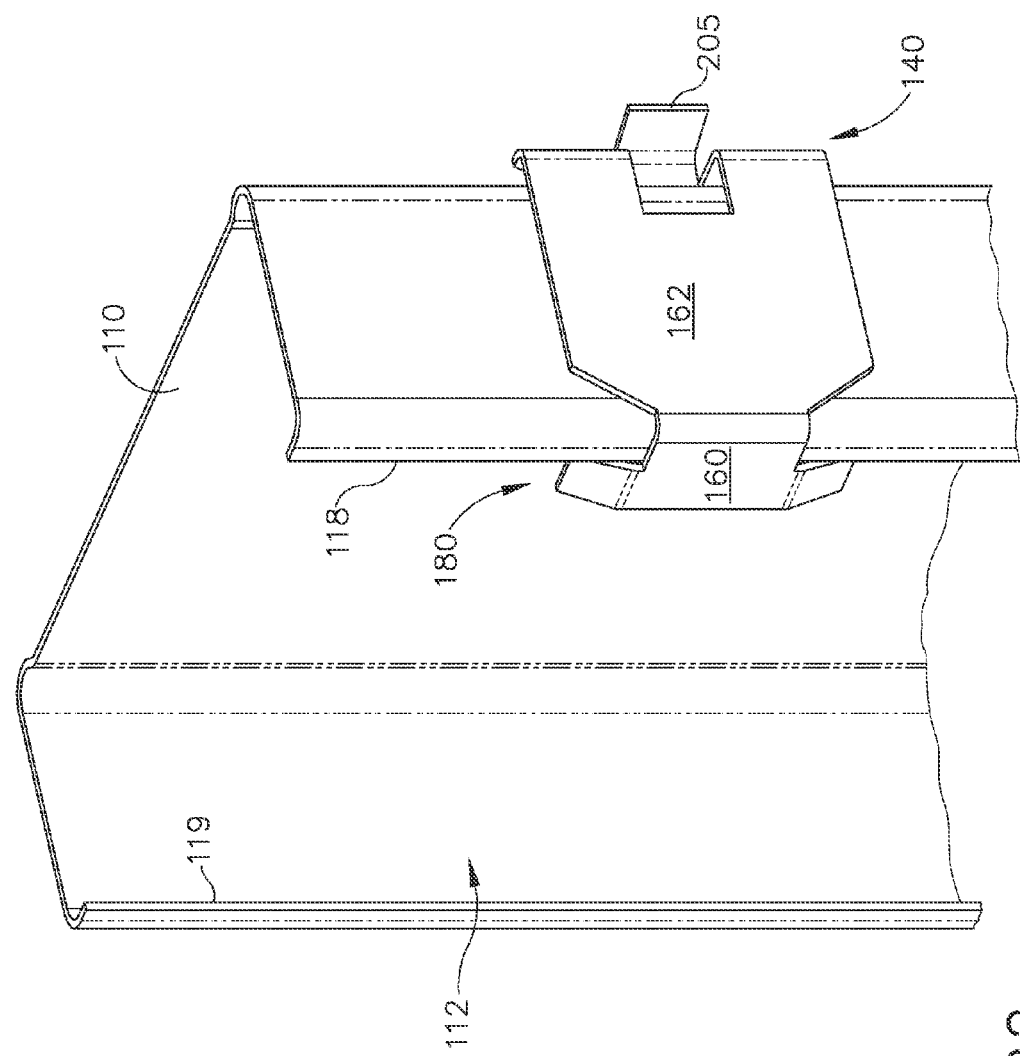
FIG. 22 depicts a second perspective view of the second engaging tab shown in FIG. 13 connected with a stud in a second manner, in accordance with one embodiment.

With reference to FIGS. 13-22, in one preferred embodiment, the first compressible member forms an L-shaped flat spring 204 which slant inwardly in the first direction $D_1$ and is connected with the first engagement member 142. Preferably, the L-shaped flat spring 204 includes a trailing edge 206 which is a distance $d_3$ from an inward surface 166 of the side engagement member 162. With reference to FIGS. 16 and 18, preferably, each stud 110 forms a bulge 116, 117 at a corner of the stud 110 and extending away from a flat surface formed on a closed face 114 of the stud 110 and a pair of edges 118, 119 which extend a distance of less than $d_3$ from each side face 128, 129 at the open face 112. Preferably, each bulge 116, 117 has a length of less than $d_3$, so that the trailing edge 206 of the L-shaped flat spring 204 may catch and rest against a bulge 116 or 117 or an edge 118 or 119, depending on how the first engaging tab 140 is mounted to the stud 110, further securing the electrical box support assembly 100 to the stud 110.

Preferably, the L-shaped flat spring 204 includes a release tab 205 for moving the first compressible member 170 in the second direction $D_2$ and away from the stud 110. The release tab 205 aids a user in decoupling and removing the engaging tab 140 from or adjusting the engaging tab 140 against the stud 110.

In one embodiment, the second engagement member 160 forms a pair of arrow-shaped alignment windows 168 sandwiching a fastening hole 169 through which a fastener, such as a nail or screw, may be inserted to further secure the electrical box support assembly 100 to the stud 110. The alignment windows 168 help a user to precisely align the electrical box support assembly 100 to a particular spot on the stud 110, which may or may not be pre-marked.

Figure 38:
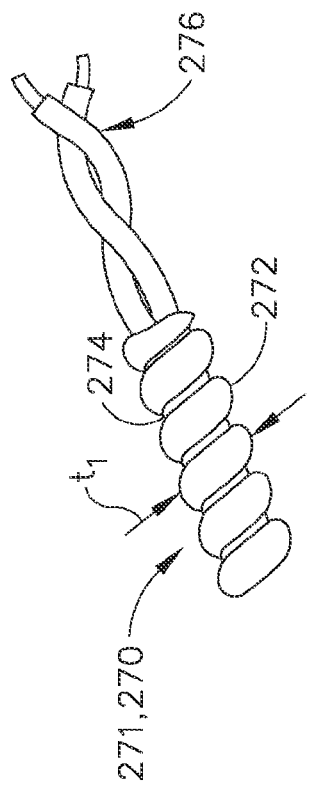
FIG. 38 depicts a top view of a conduit/cable, in accordance with one embodiment.

With reference to FIGS. 29-33, in one embodiment, the support assembly 50 is a conduit/cable support assembly 211 connected with a stud 110 for securing and guiding conduit and/or cable 270 ("conduit/cable 270") within a wall. The conduit/cable 270 includes any conduit, cable or wiring which may be secured and positioned within a wall and which is preferably flexible, such as: armored cable 271 having a corrugated metal sheathing 272, as shown in FIG. 38; electrical wire 276 which may be housed within the armored cable 271 and which includes any electrical wires which conduct electricity, such as copper wiring, speaker wiring, solid wiring, and stranded wiring; communications cables such as CAT5 cabling, coaxial cable, optical fiber, and twisted pair copper wiring; plumbing conduit; electrical cable or communications cable conduit; plastic conduit; and metal conduit.

Figure 31:
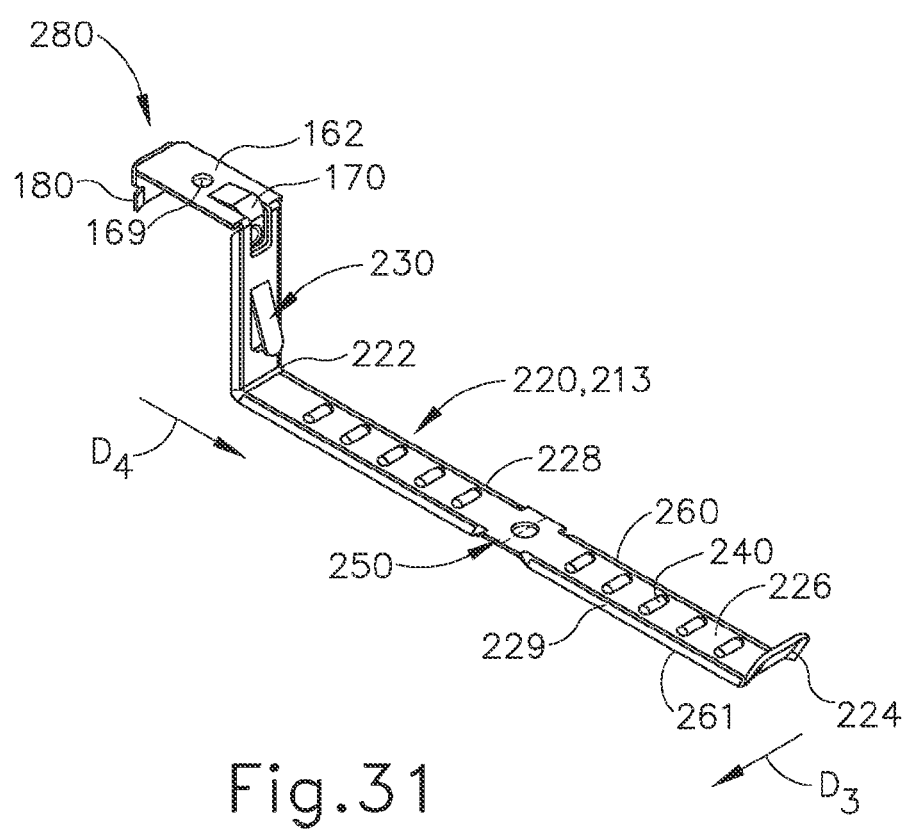
FIG. 31 depicts a first perspective view of a conduit/cable support assembly, in accordance with one embodiment.
Figure 32:
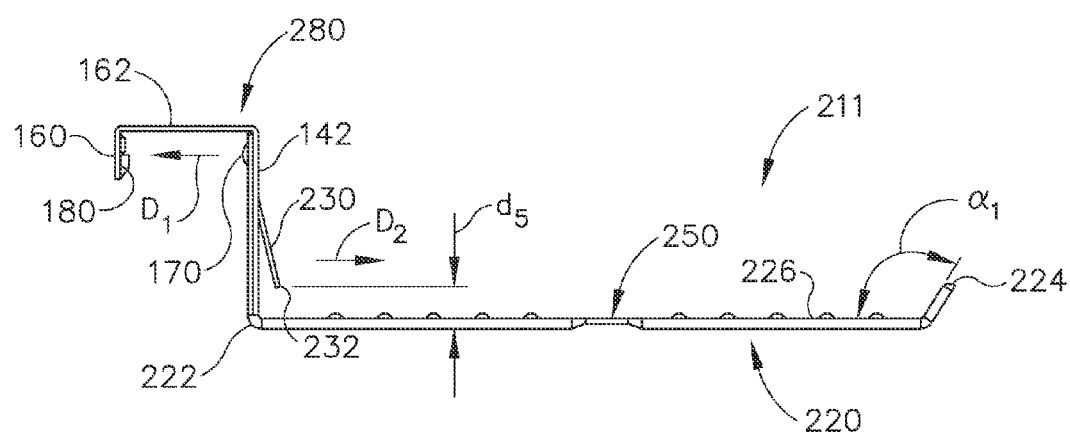
FIG. 32 depicts a side view of the conduit/cable support assembly shown in FIG. 31, in accordance with one embodiment.

The conduit/cable support assembly 211 includes a structural member 213 connected with an engaging tab 280 for fastening the support assembly 211 to a wall stud 110. Preferably, the structural member 213 is a securing arm 220 for securing and guiding the conduit/cable 270. The securing arm 220 includes a first end 222 which is connected with the engaging tab 280 opposed to a second end 224. Preferably the first end 222 is fixedly connected with the engaging tab 280, and therefore the engaging tab 280 does not need to include first and second coupling members 144, 145. However, the first end 222 may be removably or adjustably connected with the engaging tab 280 in one of at least two positions. With reference to FIGS. 31 and 32, the second end 224 may be bent upwards away from a top surface 226 at an angle $\alpha_1$ with respect to the top surface 226, as shown in FIG. 32. Preferably angle $\alpha_1$ is from 5° to 85°, and more preferably from 30° to 70° in order to better secure the second end 224 against the securing tab 230. By forming a second end 224 which bends upwards at an angle of $\alpha_1$ allows the securing arm 220, when in the second position, to provide uniform pressure across the length of the securing arm 220 and against any conduit/cable sandwiched in between portions 214, 216 of the securing arm 220. Instead of creating a V-shaped bend where the bend line is at a vertex of the bend portion 250, forming a second end 224 which bends upwards at an angle of $\alpha_1$ provides a bend which is more of a rectangular shape or U-shape at the vertex of the bend portion 250, more evenly distributing pressure across the entire length of the securing arm 220.

Figure 35:
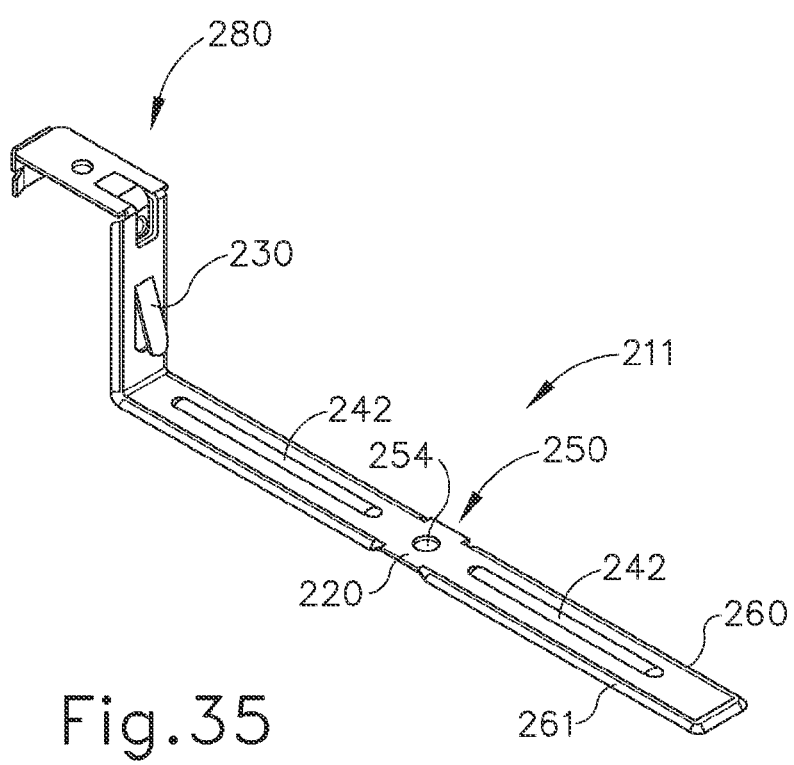
FIG. 35 depicts a perspective view of a conduit/cable support assembly, in accordance with one embodiment.
Figure 36:
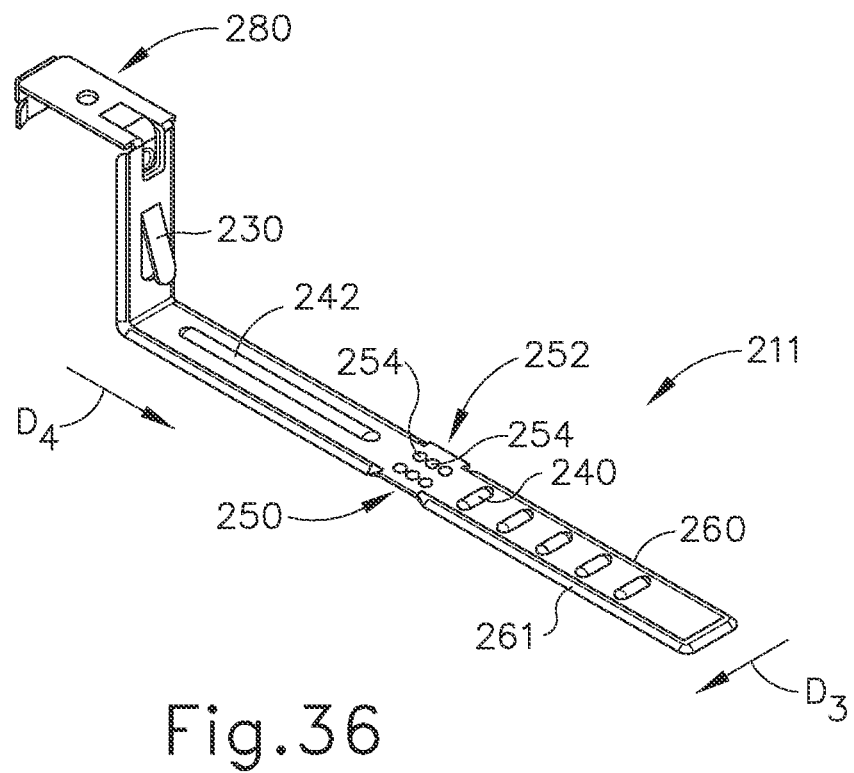
FIG. 36 depicts a perspective view of a conduit/cable support assembly in a first position, in accordance with one embodiment.
Figure 37:
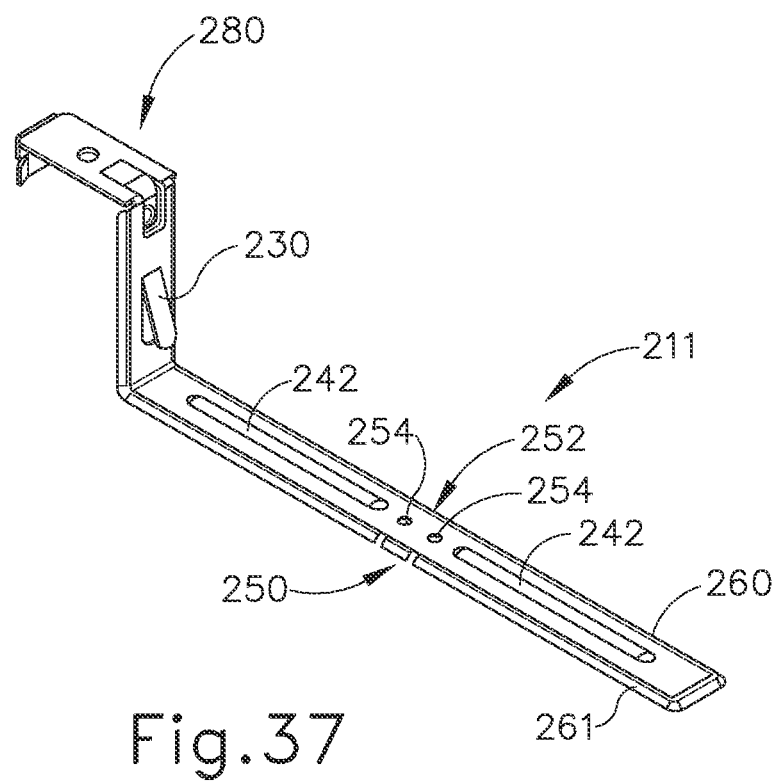
FIG. 37 depicts a perspective view of a conduit/cable support assembly, in accordance with one embodiment.
Figure 41:
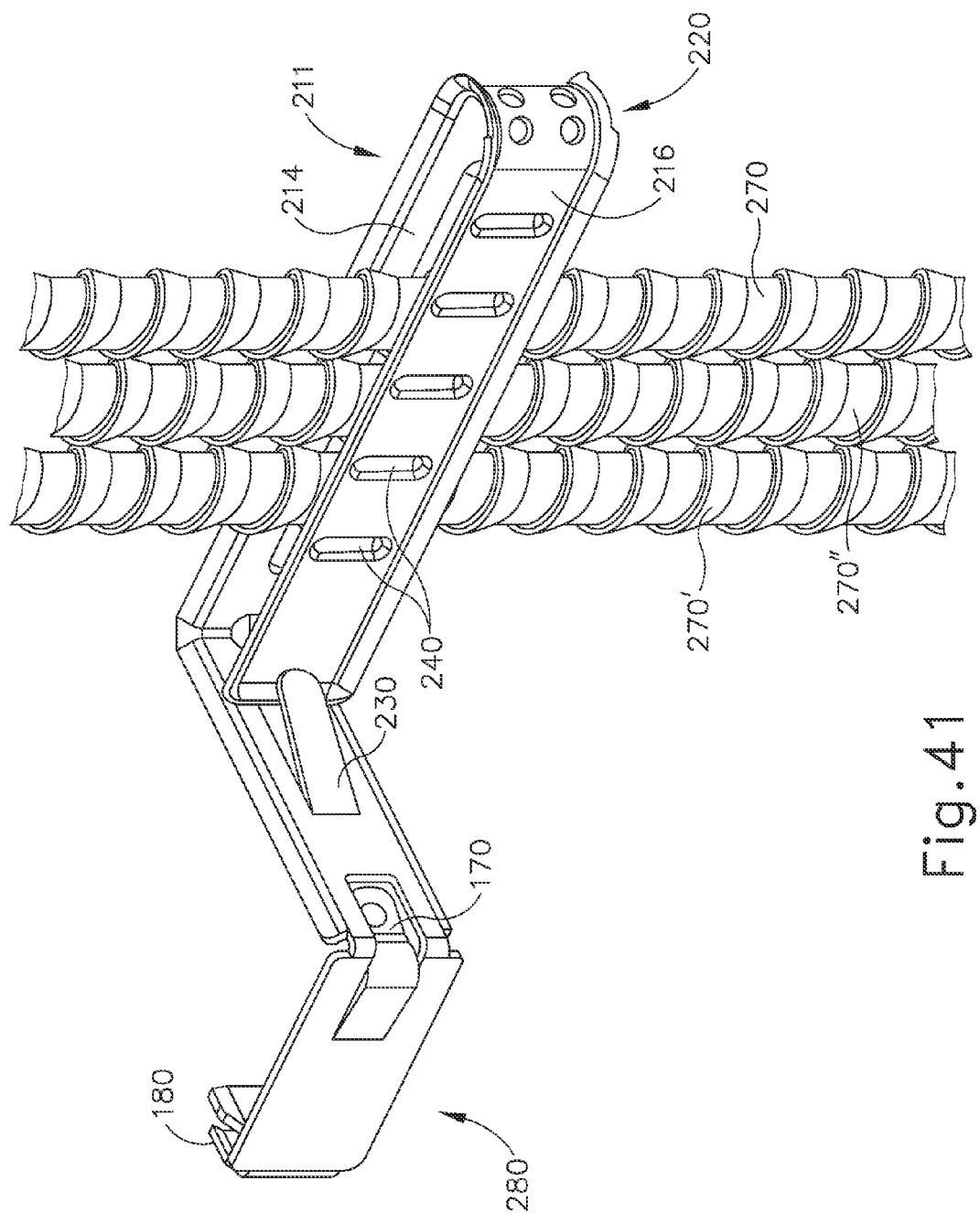
FIG. 41 depicts a perspective view of a conduit/cable support assembly in a second position, in accordance with one embodiment.

Preferably, in one embodiment, the securing arm 220 includes a bend portion 250 at which the securing arm 220 is bent. The bend portion 250 is located in between a first end 222 of the securing arm 220 connected with the engaging tab 280 and a second end of the securing arm 224 opposed to the first end 222. Preferably, the bend portion is generally centered between the first end 222 and the second end 224, to within ±20% of the length $L_2$ measured from the first end 222 to the second end 224. Preferably, the bend portion 250 is a portion of the securing arm 22 which is structurally weakened in some way, such as by having a thinner profile, having less material for a given surface area than another portion of the of the securing arm, has less or no stiffening members, forms a hole 254 or a relief pattern 252 made of a plurality of holes 254, as shown in FIGS. 35-37. Preferably, the securing arm 220 is movable from a first position where the second end 224 is not biased against the engaging tab 280, or a portion thereof such as a securing tab 230, as shown in FIG. 31, to a second position where the securing arm 220 is bent along the bend portion 250 and the second end 224 is biased against the engaging tab 280, or a portion thereof such as a securing tab 230, as shown in FIG. 41.

Figure 30:
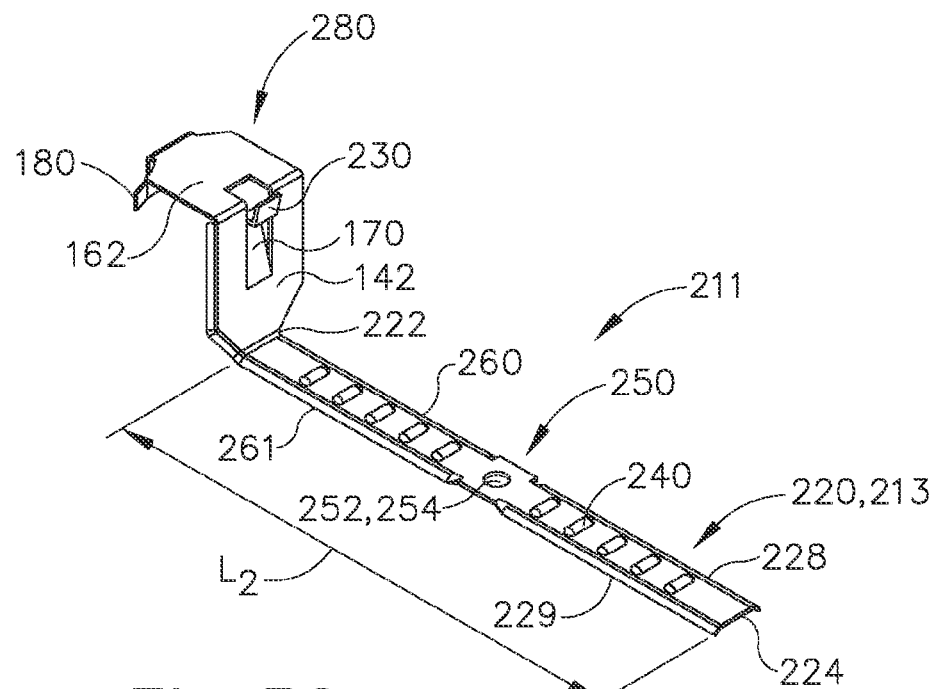
FIG. 30 depicts a perspective view of a conduit/cable support assembly, in accordance with one embodiment.

With reference to FIG. 30, in one embodiment, the bend portion 250 includes a relief pattern 252 made from a hole 254 formed through the stiffening arm 220 in the bend portion 250. Preferably, the securing arm 254 is bent along the hole 254. Preferably, in one embodiment, the relief pattern 252 includes a plurality of holes 254, wherein one of the holes 254 is closer to the first end 222 than the second hole 254, as shown in FIGS. 36 and 37, forming a widened bend portion 250. In this manner, the widened bend portion 250 allows for a more gradual U-shaped bend, as shown in FIG. 41, than a sharp V-shaped bend of a single hole which forms a narrowed bend portion 250.

Preferably, in one embodiment, the securing arm 220 is formed from a flexible material, such as a metal including aluminum or steel, or a plastic. Preferably, the securing arm 220 is formed from a generally flattened sheet of material, and preferably, the conduit/cable support assembly 211 is all formed from a single, unitary piece of material, and preferably stamped out from a single flat sheet of material, such as a sheet of metal.

The securing arm 220 includes a first outer edge 228 formed from the first end 222 to the second end 224 and a second outer edge 229 opposed to the first outer edge 228 formed from the first end 222 to the second end 224, wherein the first outer edge 228 the second outer edge 229, the first end 222, and the second end 224 define the perimeter of the securing arm 220. Preferably, the first and second outer edges 228, 229 are longer than the first and second ends 222, 224, each having a length of $L_2$. Preferably, the length $L_2$ is from 5 cm to 100 cm.

Preferably, in one embodiment, the securing arm 220 forms a first stiffening flange 260 along the first outer edge 228 and a second stiffening flange 261 along the second outer edge 229, as shown in FIG. 31. Preferably, the stiffening flanges 260, 261 are portions of the securing arm 220 which are bent along a direction $D_4$ from the first end 222 to the second end 224 in order to prevent the securing arm 220 from being bent in a direction $D_3$ from the first outer edge 228 to the second outer edge 229, as shown in FIG. 31, along any portion of the securing arm 220 in which stiffening flanges 260, 261 are present. The stiffening flanges 260, 261 are formed along outer edges 228, 229 of the securing arm 220 in order to selectively provide rigidity to the stiffening arm at portions of the securing arm 220 in which the stiffening flanges 260, 261 are formed. Preferably, the stiffening flanges 260, 261 are not formed at the bend portion 250 of the securing arm 220.

With reference to FIGS. 30-31, in one embodiment, the securing arm 220 forms at least one of, and preferably a plurality of, positioning ribs 240 which extend in the direction $D_3$ for guiding the conduit/cable 270 along a path. Preferably a given conduit/cable 270 is positioned in between an adjacent pair of positioning ribs 240, as shown in FIG. 41 in order to position and guide the conduit/cable 270 within a wall.

With reference to FIGS. 36 and 37, in one embodiment, the securing arm 220 forms at least one securing rib 242 which extends in the direction $D_4$ for securing the conduit/cable 270 to the securing arm 220. Preferably, the conduit/cable 270 is placed over the securing rib 242 along the direction $D_3$, and upon moving the securing arm 220 from the first position to the second position, preferably the securing rib 242 applies some pressure onto the conduit/cable 270, securing the conduit/cable 270 to the securing arm 220. With reference to FIG. 36, in one embodiment, the securing arm 220 includes a plurality of securing ribs 242, having at least one securing rib 242 on each side of the bend portion 250. With reference to FIG. 37, in one embodiment, the securing arm 220 includes a securing rib 242 on one side of the bend portion 250 and at least one, as preferably a plurality of, positioning ribs 240 on an opposing side of the bend portion 250 allowing the securing arm 220 to be able to both guide and secure the conduit/cable 270.

Figure 34:
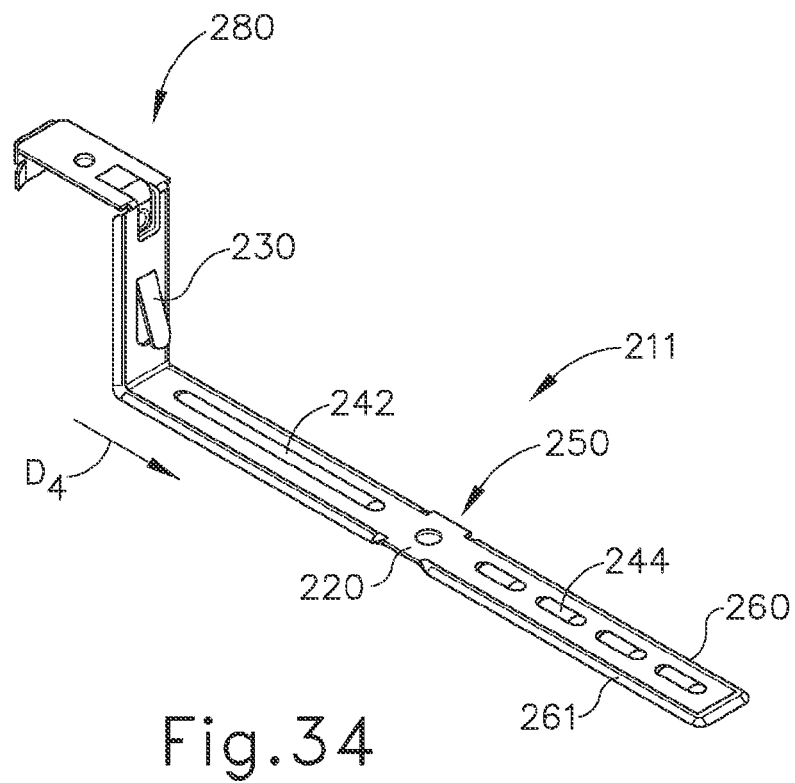
FIG. 34 depicts a perspective view of a conduit/cable support assembly, in accordance with one embodiment.

With reference to FIG. 34, in one embodiment, the securing arm 220 forms at least one, and preferably a plurality of securing and positioning ribs 244 spaced apart from each other and which extends in the direction $D_4$ for both securing and positioning the conduit/cable 270. Preferably, the conduit/cable 270 is placed in between a pair of adjacent securing and positioning ribs 244 along a direction $D_3$, and upon moving the securing arm 220 from the first position to the second position, preferably the securing and positioning ribs 244 applies some pressure onto the conduit/cable 270 in addition to positioning the conduit/cable 270.

In one embodiment, the conduit/cable 270 forms a groove 274 or spiral channel on or around the conduit/cable 270, as shown in FIG. 38. Preferably, the groove 274 is positioned on, and preferably mated with, a securing rib 242 or a securing and positioning rib 244 in order to further secure the conduit/cable 270 with the securing arm 220. In one embodiment, the conduit/cable 270 is positioned in between an adjacent pair of positioning ribs 240, as shown in FIG. 41 in order to position and guide the conduit/cable 270 within a wall.

With reference to FIG. 32, in one embodiment, the conduit/cable support assembly 211 further comprises a securing tab 230 extending from the engaging tab 280, preferably from a first engagement member 142 of the engaging tab 280, in a second direction $D_2$ opposite that of the first direction $D_1$. Preferably, the securing arm 220 is movable from a first position where the second end 224 is not biased against the securing tab 230, as shown in FIG. 30, to a second position wherein the securing arm 220 is bent along the bend portion 250 and the second end 224 is biased against the securing tab 230, as shown in FIG. 41. The securing tab 230 includes an extended portion 232 which extends a distance away from the engaging tab 280 and upon which the second end 224 is biased against when the securing arm 220 is at the second position.

With reference to FIGS. 32 and 38, preferably, an extended portion 232 of the securing tab 230 closest to the securing arm 220 is positioned at a distance $d_5$ from a top surface 226 of the securing arm 220. Preferably, the distance $d_5$ is equal to or slightly less than a thickness $t_1$ of the conduit/cable 270 being secured by the securing arm 220 in order for the securing arm 220 to accommodate the conduit/cable 270. In this manner, by having the distance $d_5$ equal to or slightly less than a thickness $t_1$, portions 214, 216 of the securing arm 220 are flexed, applying pressure onto the conduit/cable 270 sandwiched in between the portions 214, 216 and securing the conduit/cable 270 to the securing arm 220.

Figure 29:
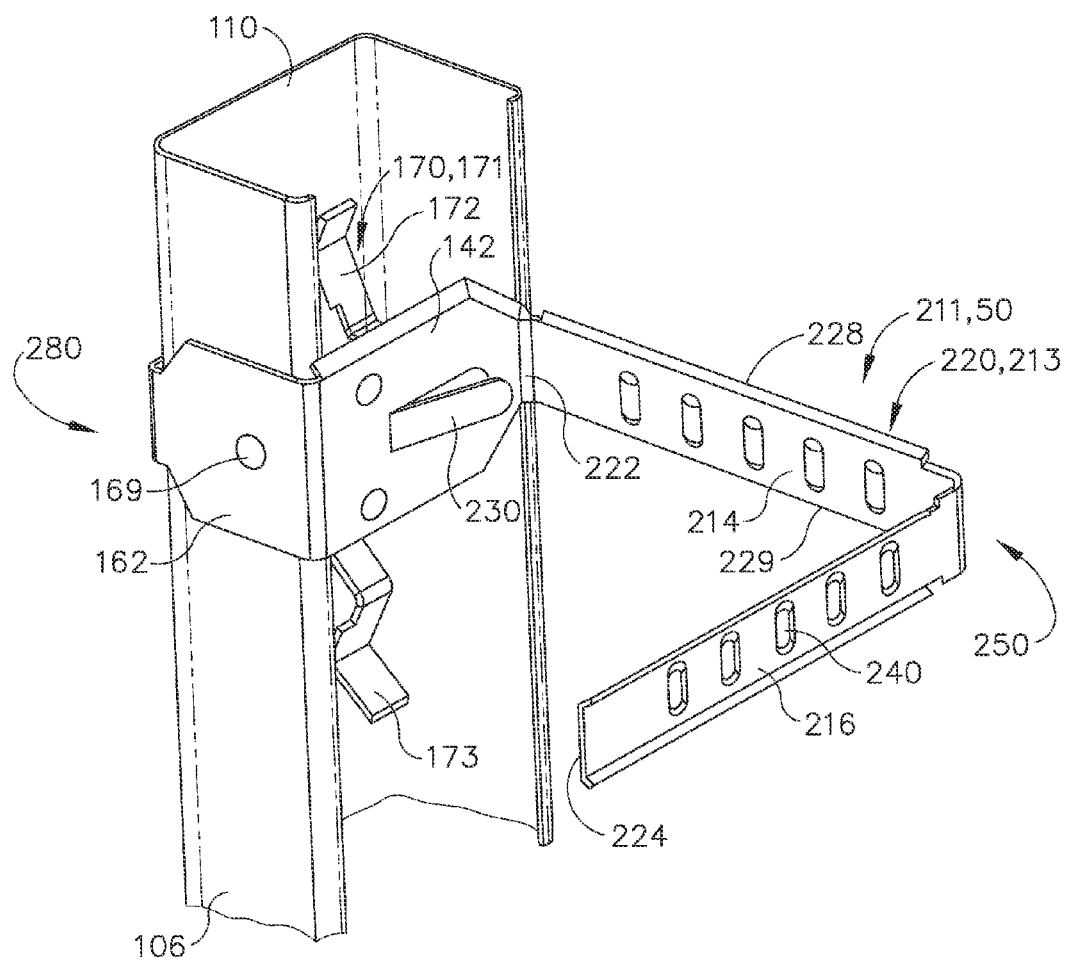
FIG. 29 depicts a perspective view of a conduit/cable support assembly connected with a wall stud, in accordance with one embodiment.

The single engaging tab 280 has a structure which mirrors that of previously discussed engaging tabs 140 or 190. The engaging tab 280 is coupled with the securing arm 220, and preferably, coupled with the first end 22 of the securing arm 220. Preferably the engaging tab 280 is fixedly coupled with the securing arm 220, however, the engaging tab 280 may be removably or adjustably coupled with the securing arm 220 in one, or more than one predetermined and fixed positions. The engaging tab 280 includes some or all of the elements of previously discussed engaging tabs 140 or 190, and as a result, for elements which are the same or similar, previously used element numbers will be reused. Engaging tab 280 includes a first engagement member 142 facing a second engagement member 160 and a side engagement 162 member connecting the first and second engagement members 142, 160 together. Preferably, the side engagement member 162 is adapted to sit flush against a mounting face 106 of the stud 110, as shown in FIG. 29. A mounting face of the stud 110 is the surface of the stud 110 upon which items, such as drywall, are mounted onto and fastened to.

The engaging tab 280 also includes a first compressible member 170 extending in a first direction $D_1$ either from the first engagement member 142 towards the second engagement member 160 or from the second engagement member 160 towards the first engagement member 142. The first compressible member 170 is compressible in a second direction $D_2$ opposite that of the first direction $D_1$.

Figure 33:
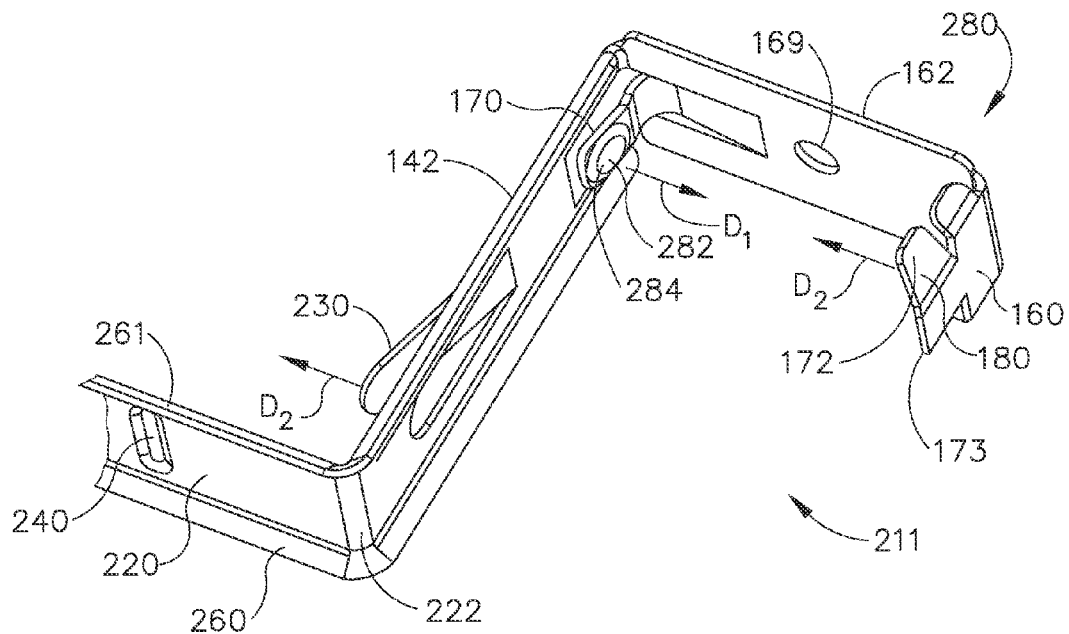
FIG. 33 depicts an enlarged second perspective view of the conduit/cable support assembly shown in FIG. 31, in accordance with one embodiment.

With reference to FIG. 33, preferably, the first compressible member 170 is connected with one of the first engagement member 142, the second engagement member 160, and the side engagement member 162. Preferably, at least a portion of the first compressible member 170 is extending from either the first engagement member 142 or the second engagement member 160 in a first direction $D_1$ either from the first engagement member 142 towards the second engagement member 160 or from the second engagement member 160 towards the first engagement member 142. For example, in FIG. 33, the first compressible member 170 is connected with the side engagement member 162, yet a portion 282 of the first compressible member 170 is extending from the first engagement member 142 to the second engagement member 160 in a first direction $D_1$. By extending in a first direction $D_1$, the first compressible member 170 is able to allow the engaging tab 280 to be coupled with a wall stud 110, preferably by having the compressible member 170 applies a force $F_1$, as shown in FIG. 8, in a direction which is opposed to that of the direction in which the compressible member 170 is compressed. This allows an installer to more easily install a support assembly 50, such as conduit/cable support assembly 211, since once engaged with the stud 110, the compressible member 270 can hold the support assembly 211 in a set position while an installer may insert additional fasteners through portions of the support assembly 211, such as through a fastening hole 169 formed in side engagement member 162, in order to securely fasten the support assembly 211 to a wall stud 110.

Figure 39:
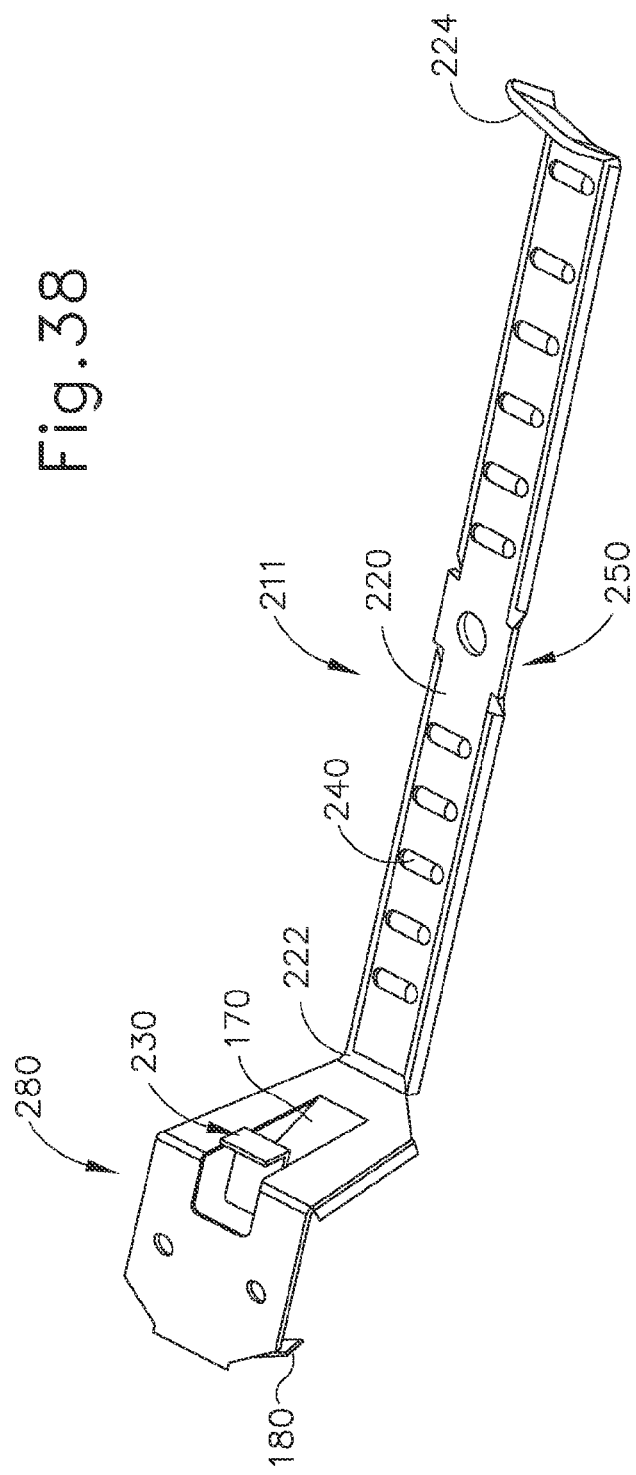
FIG. 39 depicts a perspective view of a conduit/cable support assembly, in accordance with one embodiment.
Figure 40:
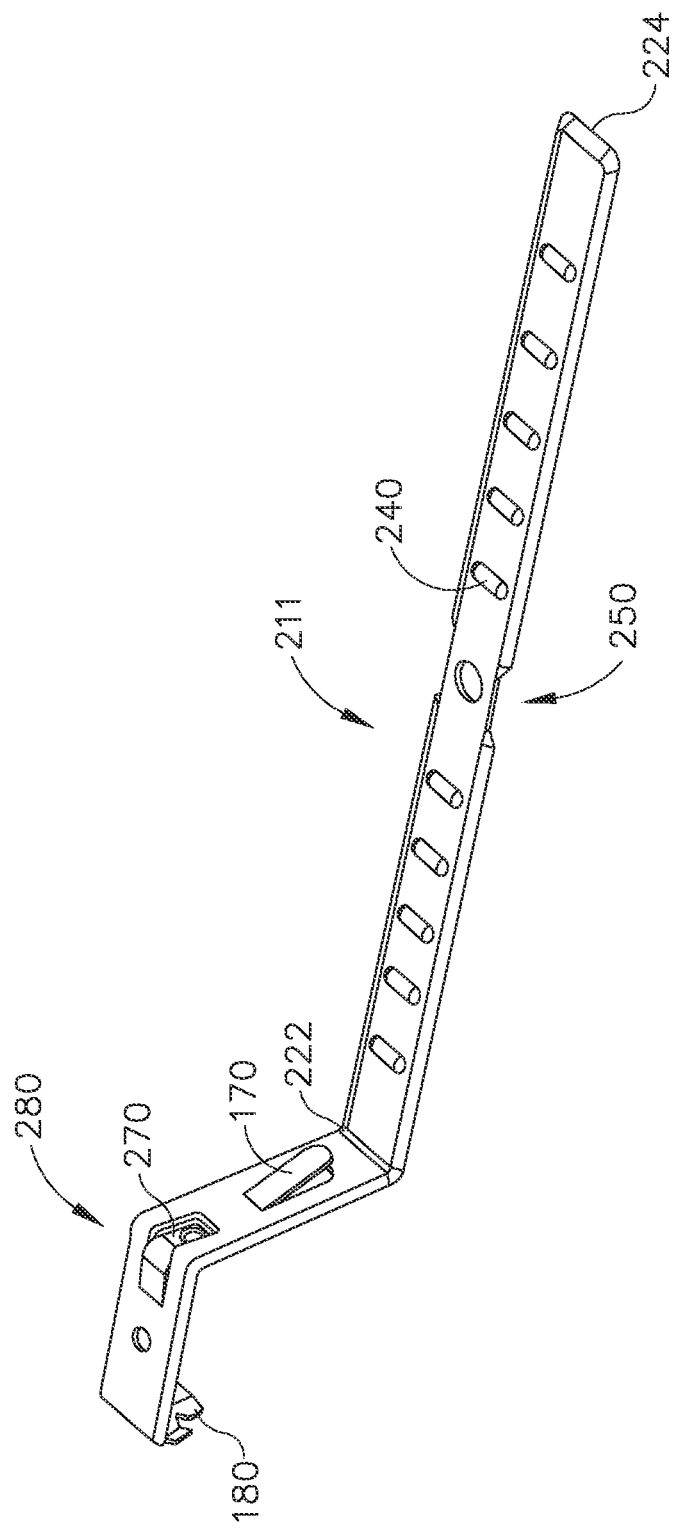
FIG. 40 depicts a perspective view of a conduit/cable support assembly, in accordance with one embodiment.

With reference to FIG. 33, the engaging tab 280 further includes a securing tab 230 extending from the first engagement member 142 in a second direction $D_2$ opposite that of the first direction $D_1$. The securing tab 230 helps to secure and hold the second end 224 of the securing arm 220 when in the second position, helping to hold and secure any conduit/cable 270 which is sandwiched in between portions of the bent securing arm 220, when in the second position. With reference to FIG. 39, in one embodiment, the securing tab 230 is formed adjacent the first compressible member 270, from the same piece of material, wherein both are connected with the first engagement member 142.

With reference to FIG. 33, in one embodiment, the engaging tab 280 further includes a second compressible member 180, wherein the first compressible member 170 extends from the first engagement member 142 in a first direction $D_1$ towards the second engagement member 160, and wherein the second compressible member 180 extends from the second engagement member 160 in a second direction $D_2$ opposite that of the first direction $D_1$ and towards the first engagement member 142. By using a plurality of compressible members 170, 180, the engaging tab 280 is able to more securely engage the wall stud 110.

With reference to FIG. 33, in one embodiment, either the first or second compressible member 170, 180 includes a pair of winged members 172, 173 which slant inwardly in the first direction $D_1$ or the second direction $D_2$. In one embodiment, the compressible member 170 forms a dimple 284 extending in the first direction $D_1$ or the second direction $D_2$.

In operation, the support assembly 50 is fastened with a wall stud 110 as follows. First, an installer is provided with a support assembly 50, such as electrical box support assembly 100 or conduit/cable support assembly 211, having a structural member 213, such as telescoping struts 120, 130 or securing arm 220, and an engaging tab 140, 190 or 280 for connecting the structural member 213 with the wall stud 110. The engaging tab 140, 190 or 280 is coupled with an end of the structural member 213. The engaging tab 140, 190 or 280 includes a first engagement member 142 facing a second engagement member 160, a side engagement member 162 connecting the first and second engagement members 142, 160 together, and a first compressible member 170 extending either from the first engagement member 142 towards the second engagement member 160 or from the second engagement member 160 towards the first engagement member 142. Then, the installer fastens the support assembly 50 to the stud 110 by pressing the engaging tab 140 140, 190 or 280 onto the stud 110 so that the side engagement member 162 engages the mounting face 106 of the stud 110 and thereby compressing the compressible member 170 or 180 against the stud 110.

In order to secure and guide conduit/cable 270 using the support assembly 211, preferably, after mounting and securing the support assembly 211 to the wall stud 110, conduit/cable 270 is placed in between positioning ribs 240 and/or securing and positioning ribs 244 and/or placed on top of securing rubs 242, preferably along a first portion 214 of the securing arm 220 from the first end 222 to the bend portion 250. With reference to FIGS. 29 and 41, then a second portion 216 of the securing arm 220 from the bend portion 250 to the second end 224 is grasped by an installer and bent towards the first portion 214 of the securing arm 220 from a first position to a second position whereby the second end 224 engages and is locked in place by the securing tab 230. In the second position, the first portion 214 and second portion 216 of the securing arm 220 sandwich and secure the conduit/cable 270 in place. As a result, the securing arm 220 is movable from a first position where the second end 224 is not biased against the securing tab 230 to a second position wherein the securing arm 220 is bent along the bend portion 250 and the second end 224 is biased against the securing tab 230.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While various embodiments of the invention have been described, it will be apparent to those of ordinary skill in the art that other embodiments and implementations are possible within the scope of the invention. Accordingly, the invention is not to be restricted except in light of the attached claims and their equivalents.

The invention claimed is:

1. A support assembly securing and guiding at least one of a conduit and a cable configured to be connected with a stud comprising:
   a securing arm securing and guiding the at least one of the conduit and the cable, the securing arm including a first end and a second end; and
   an engaging tab coupled with the first end of the securing arm, wherein the engaging tab includes:
      a first engagement member facing a second engagement member,
      a side engagement member connecting the first and second engagement members together,
      a first compressible member extending in either a first direction from the first engagement member towards the second engagement member or in a second direction from the second engagement member towards the first engagement member, and wherein the first compressible member is compressible in a direction opposite to the one of the first direction or the second direction in which the first compressible member extends, and
      a securing tab extending from the first engagement member in the second direction; and
   wherein the securing arm includes a bend portion at which the securing arm is bent, and wherein the bend portion is located in between the first end of the securing arm connected with the first engagement member and the second end of the securing arm opposed to the first end, wherein the securing arm is movable from a first position where the second end is not biased against the securing tab to a second position wherein the securing arm is bent along the bend portion and the second end is biased against the securing tab; and
   wherein a distance from the securing tab to the securing arm is greater than zero and less than a thickness of the at least one of the conduit and the cable being secured by the securing arm.

2. The support assembly of claim 1, wherein the engaging tab further includes a second compressible member, wherein the first compressible member extends from the first engagement member in the first direction towards the second engagement member, and wherein the second compressible member extends from the second engagement member in the second direction opposite that of the first direction and towards the first engagement member.

3. The support assembly of claim 1, wherein the first compressible member includes a pair of winged members which slant inwardly in the first direction.

4. The support assembly of claim 3, wherein each winged member includes a trailing edge which is a distance from an inward surface of the side engagement member, wherein each stud forms a bulge at a corner of the stud and extending away from a flat surface formed on a closed face of the stud, and wherein the bulge has a length of less than the distance.

5. The support assembly of claim 1, wherein the bend portion includes a relief pattern made from a hole formed through the securing arm in the bend portion.

6. The support assembly of claim 1, wherein the securing arm includes a plurality of stiffening flanges formed along outer edges of the securing arm in order to selectively provide rigidity to the securing arm at portions of the securing arm in which the stiffening flanges are formed.

7. The support assembly of claim 6, wherein the stiffening flanges are not formed at the bend portion of the securing arm.

8. The support assembly of claim 1, wherein the securing arm forms a plurality of positioning ribs which extend in a third direction guiding the at least one of a conduit and a cable.

9. The support assembly of claim 1, wherein the securing arm is flexible.

10. The support assembly of claim 9, wherein the securing arm is formed from a flexible material such as a metal including aluminum or steel, or a plastic.

11. The support assembly of claim 1, wherein the first engagement member has a first end and a second end, and wherein the securing tab extends from the first engagement member between the first end and the second end of the first engagement member.

12. A support assembly configured to be connected with a stud for securing and guiding at least one of a conduit and a cable comprising:

a securing arm for securing and guiding at least one of the conduit and the cable, the securing arm including a first end and a second end; and an engaging tab coupled with the first end of the securing arm, wherein the engaging tab includes:
  a first engagement member facing a second engagement member,
  a side engagement member connecting the first and second engagement members together,
  a first compressible member extending in either a first direction from the first engagement member towards the second engagement member or in a second direction from the second engagement member towards the first engagement member, and wherein the first compressible member is compressible in a direction opposite to the one of the first direction or the second direction in which the first compressible member extends, and
  a securing tab extending from the first engagement member in the second direction; and wherein the securing arm includes a bend portion located between the first end of the securing arm and the second end of the securing arm;

wherein the securing arm includes a first stiffening flange formed along a first outer edge of the securing arm and a second stiffening flange formed along a second outer edge of the securing arm opposite the first outer edge;

wherein the first stiffening flange comprises a first portion and a second portion spaced-apart from one another with the first portion on one side of the bend portion and the second portion on an opposite side of the bend portion such that neither of the first portion and the second portion of the first stiffening flange are formed at the bend portion; and wherein the second stiffening flange comprises a first portion and a second portion spaced-apart from one another with the first portion on one side of the bend portion and the second portion on an opposite side of the bend portion such that neither of the first portion and the second portion of the second stiffening flange are formed at the bend portion.

* * * * *